(12) United States Patent
Willson

(10) Patent No.: US 8,271,430 B2
(45) Date of Patent: Sep. 18, 2012

(54) METHODS AND SYSTEMS FOR METADATA DRIVEN DATA CAPTURE FOR A TEMPORAL DATA WAREHOUSE

(75) Inventor: Ian Alexander Willson, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 642 days.

(21) Appl. No.: 12/256,133

(22) Filed: Oct. 22, 2008

(65) Prior Publication Data

US 2009/0299987 A1    Dec. 3, 2009

Related U.S. Application Data

(60) Provisional application No. 61/057,978, filed on Jun. 2, 2008.

(51) Int. Cl.
*G06F 17/00* (2006.01)
*G06F 7/00* (2006.01)
(52) U.S. Cl. ....................................... 707/602
(58) Field of Classification Search ................... 707/602
See application file for complete search history.

(56) References Cited

U.S. PATENT DOCUMENTS

| | | | |
|---|---|---|---|
| 6,339,775 B1 | 1/2002 | Zamanian et al. | |
| 7,003,504 B1 | 2/2006 | Angus et al. | |
| 7,287,043 B2 * | 10/2007 | Lindsay et al. | 707/999.1 |
| 7,392,206 B1 * | 6/2008 | Frazier et al. | 705/26.7 |
| 7,424,499 B2 * | 9/2008 | Lomet | 707/999.206 |
| 7,558,786 B2 * | 7/2009 | Robson et al. | 707/758 |
| 7,822,629 B2 * | 10/2010 | Chen et al. | 705/7.29 |
| 7,882,103 B2 * | 2/2011 | Brobst | 707/717 |
| 2004/0199867 A1 | 10/2004 | Brandenborg | |
| 2006/0004746 A1 | 1/2006 | Angus et al. | |

* cited by examiner

*Primary Examiner* — Sathyanarayan Pannala
(74) *Attorney, Agent, or Firm* — Armstrong Teasdale, LLP

(57) ABSTRACT

A system is described that includes a data warehouse and a platform independent data warehouse load application operable to run on the system. The load application includes a sequencing unit configured to utilize timestamp data from incoming data to be stored in the data warehouse and a relational algebra of set operators to identify and sequence net changes between the incoming data and data previously stored within the data warehouse. The load application is configured to non-intrusively load the identified and sequenced net changes into the data warehouse.

20 Claims, 16 Drawing Sheets

METHODS AND SYSTEMS FOR METADATA DRIVEN DATA CAPTURE FOR A TEMPORAL DATA WAREHOUSE

CROSS REFERENCE TO RELATED APPLICATIONS

This application claims the priority of Provisional Patent Application Ser. No. 61/057,978, filed Jun. 2, 2008, and titled "Methods And Systems For Metadata Driven Data Capture For A Temporal Data Warehouse" which is hereby incorporated by reference in its entirety.

BACKGROUND

The field of the disclosure relates generally to computer data warehousing (CDW), and more specifically, to methods and systems for metadata driven data capture for a temporal normalized data warehouse.

There is a need to quickly load and time sequence varying volumes of incoming data with a single general purpose design without resorting to sequential methods. Sequential methods are generally too inefficient for initialization and higher volume incoming data events. In addition, there is a need to minimize sometimes intensive pre-processing to detect changes within the data or to ensure unique valid time periods to allow creation of a load set of candidate rows for every target table, regardless of interface type. Finally, there is a need to identify changes of all types and avoid loading new data rows with no new content beyond a new authoring timestamp (valid time), which would save data space by collapsing consecutive duplicate rows of data within a temporal time period.

Currently, complex custom data load programs typically running on large external application servers are one solution to loading a temporal data warehouse. Such programs must process and apply data serially by primary key, resulting in very long run-times and extensive relatively intrusive updates to the target tables which are continually being queried by end users. In some cases, two sets of target tables are used and swapped when loading is complete to continuously support users. Typically, some data already in the database is removed, processed externally on an application server along with incoming data and re-loaded to achieve the data load, further stressing the network and database. Existing solutions also tend to only deal with anticipated situations rather than all possible situations, breaking, aborting the load or rejecting data in unanticipated cases (e.g. valid time tie within a primary key).

Some contemplated solutions have other downsides, for example, a design that is hard-coded to accept particular types of incoming data and exact target schemas is not desirable due to development costs. Maintenance costs are a concern when addressing primary key or attribute changes to the data source, data target, or method of interface. Use of extract, transform, and load (ETL) tools to perform the work outside of a database on a server is one possible solution, but is inefficient and can be affected by the amount of network traffic. Loss of efficiency in contemplated solutions is particularly large when using external or row-at-a-time solutions on the massively parallel processing (MPP) architecture widely used by data warehouses. Also, proprietary database tools require specialized knowledge and are not portable to other platforms (e.g. Oracle PL/SQL). These solutions are inefficient for larger volumes of data, making near real-time non-intrusive loading impossible (no active data warehouse) and requiring different coding for initialization or large volumes of data to achieve acceptable performance.

BRIEF DESCRIPTION

In one aspect, a system is provided that includes a data warehouse, and a platform independent data warehouse load application operable to run on the system. The load application includes a sequencing unit configured to utilize timestamp data from incoming data to be stored in the data warehouse and a relational algebra of set operators to identify and sequence net changes between the incoming data and data previously stored within the data warehouse. The load application is configured to non-intrusively load the identified and sequenced net changes into the data warehouse.

In another aspect, a method of loading a data warehouse is provided. The method includes analyzing a set of incoming data with respect to itself and an existing data warehouse, identifying and sequencing any net change data between the incoming data and the existing data warehouse using a relational algebra set of operators, normalizing said net changes with respect to a primary key within a table and a time period that varies with the sequences of rows within the primary key, and applying any net change data to the data warehouse.

In still another aspect, a computer program embodied on a computer readable medium for loading a data warehouse with net change data is provided. The program has a code segment that utilizes an autocoder to dynamically generate code to analyze a set of incoming data with respect to itself and an existing data warehouse, identify and sequence net changes between the incoming data and data previously stored within the data warehouse, and load the identified and sequenced net changes into the data warehouse.

BRIEF DESCRIPTION OF THE DRAWINGS

FIG. 11 is a data flow diagram illustrating the providing of a full key for all delete rows by finding the timestamp of the latest noncore row that the delete applies to.

DETAILED DESCRIPTION

The present disclosure may be described in a general context of computer code or machine-useable instructions, including computer-executable instructions such as program modules, being executed by a computer or other machine, such as a personal data assistant or other handheld device. Generally, program modules including routines, programs, objects, components, data structures, and the like, refer to code that perform particular tasks or implement particular abstract data types. The present disclosure may be practiced in a variety of system configurations, including hand-held devices, consumer electronics, general-purpose computers, more specialty computing devices, and the like. The present disclosure may also be practiced in distributed computing environments where tasks are performed by remote-processing devices that are linked through a communications network.

The described systems are operable to analyze a set of incoming data with respect to itself and an existing data warehouse, identify and sequence net change data, as compared to the data already stored within the data warehouse, using the relational algebra set of operators, and apply updates to the data warehouse. To accomplish such a method, software code is dynamically generated within the system to handle inserts and temporal updates, and the generated code is then executed by the system.

The embodiments described herein are related to a generic metadata-driven temporal data warehouse load design that includes run-time structured query language (SQL) code-generators that can efficiently process and load into a normalized temporal data warehouse any volume (initial load, migration, daily, hourly) and any type of source system data (push or pull, new or old data), identifying and sequencing net change information into a temporal design based on having a valid start timestamp in the primary key of every table and populating a corresponding valid end timestamp or equivalent time period using only set-SQL statements. Such processes are sometimes collectively referred to as change data capture (CDC).

The disclosed temporal data warehouse load design operates by analyzing a set of incoming data both with respect to itself and with respect to the existing data warehouse to determine a net change. Appropriate valid time sequencing (temporal design) is then assigned and efficiently applied to new sequenced rows and updates to end timestamps defining the time period in the target data warehouse using only ANSI SQL. This process dynamically generates SQL inserts and temporal updates and the SQL is executed entirely within the data warehouse database.

Figure 1:
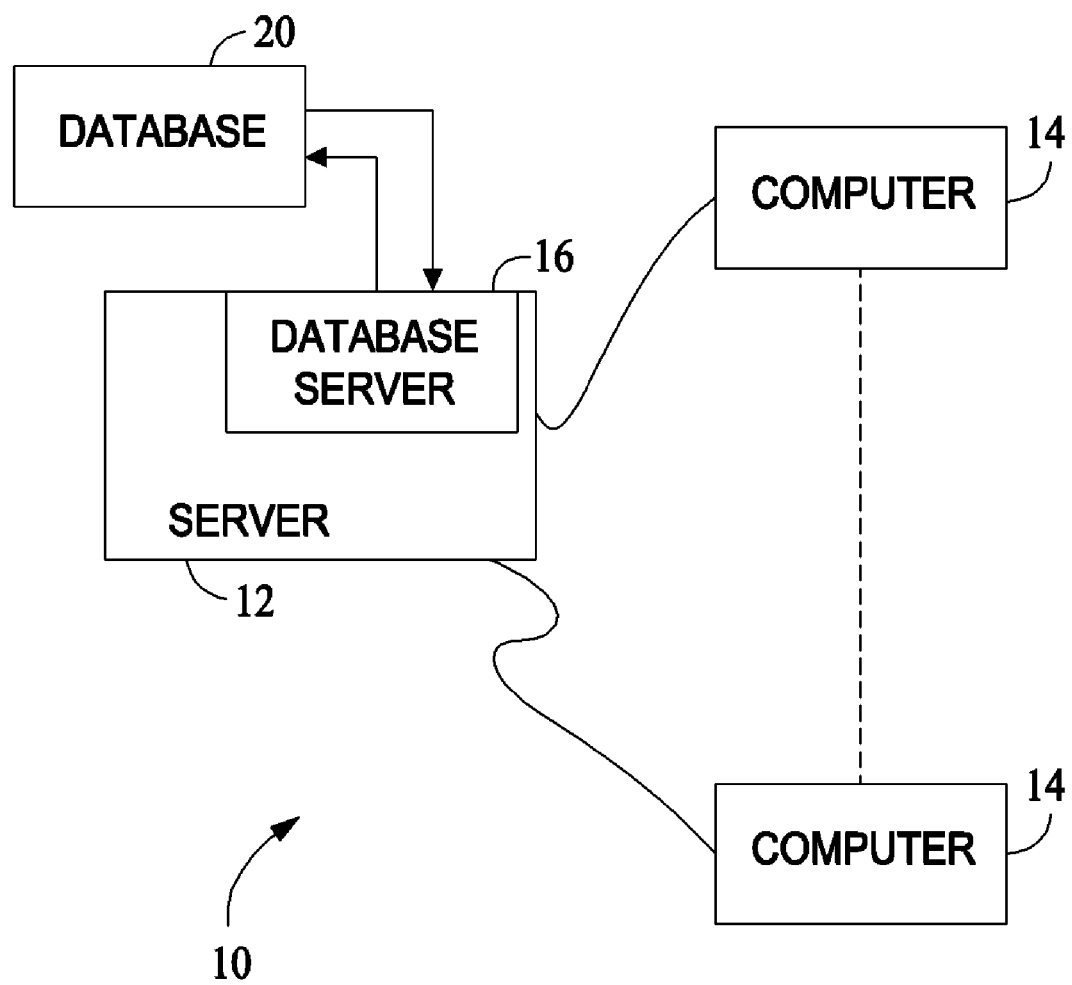
FIG. 1 is a simplified block diagram of a computer system.

FIG. 1 is a simplified block diagram of an exemplary system 10 including a server system 12, and a plurality of client sub-systems, also referred to as client systems 14, connected to server system 12. Computerized modeling and grouping tools, as described below in more detail, are stored in server 12, and can be accessed by a requester at any one of computers 14. In one embodiment, client systems 14 are computers including a web browser, such that server system 12 is accessible to client systems 14 using the Internet. Client systems 14 are interconnected to the Internet through many interfaces including a network, such as a local area network (LAN) or a wide area network (WAN), dial-in-connections, cable modems, and special high-speed ISDN lines. Client systems 14 could be any device capable of interconnecting to the Internet including a web-based phone, personal digital assistant (PDA), or other web-based connectable equipment. A database server 16 is connected to a database 20 containing information on a variety of matters, as described below in greater detail. In one embodiment, centralized database 20 is stored on server system 12 and can be accessed by potential users at one of client systems 14 by logging onto server system 12 through one of client systems 14. In an alternative embodiment, database 20 is stored remotely from server system 12 and may be non-centralized.

Figure 2:
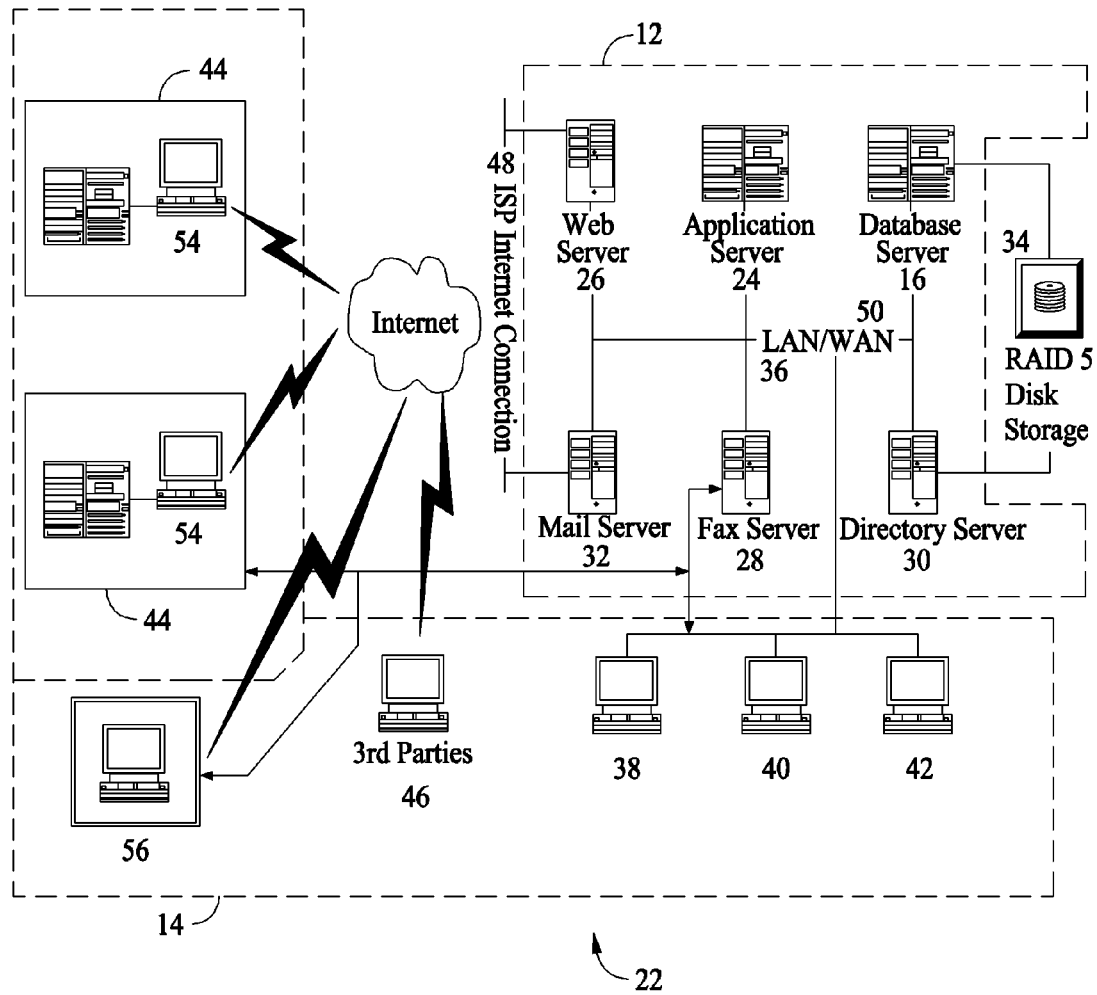
FIG. 2 is a block diagram of a computer network.

FIG. 2 is an expanded block diagram of an exemplary embodiment of a system 22. System 22 is but one example of a suitable computing environment and is not intended to suggest any limitation as to the scope of use or functionality of the present disclosure. Neither should the system 22 be interpreted as having any dependency or requirement relating to any one or combination of components illustrated herein. Components in system 22, identical to components of system 10 (shown in FIG. 1), are identified in FIG. 2 using the same reference numerals as used in FIG. 1. System 22 includes server system 12 and client systems 14. Server system 12 further includes database server 16, an application server 24, a web server 26, a fax server 28, a directory server 30, and a mail server 32. A disk storage unit 34 (which includes database 20) is coupled to database server 16 and directory server 30. Servers 16, 24, 26, 28, 30, and 32 are coupled in a local area network (LAN) 36. In addition, a system administrator's workstation 38, a user workstation 40, and a supervisor's workstation 42 are coupled to LAN 36. Alternatively, workstations 38, 40, and 42 are coupled to LAN 36 using an Internet link or are connected through an Intranet.

Each workstation, 38, 40, and 42 is a personal computer having a web browser. Although the functions performed at the workstations typically are illustrated as being performed at respective workstations 38, 40, and 42, such functions can be performed at one of many personal computers coupled to LAN 36. Workstations 38, 40, and 42 are illustrated as being associated with separate functions only to facilitate an understanding of the different types of functions that can be performed by individuals having access to LAN 36.

Server system 12 is configured to be communicatively coupled to various individuals, including employees 44 and to third parties, e.g., customers/contractors 46 using an internet service provider (ISP) Internet connection 48. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 50, local area network 36 could be used in place of WAN 50.

In the exemplary embodiment, any authorized individual having a workstation 54 can access system 22. At least one of the client systems includes a manager workstation 56 located at a remote location. Workstations 54 and 56 are personal computers having a web browser. Also, workstations 54 and 56 are configured to communicate with server system 12. Furthermore, fax server 28 communicates with remotely located client systems, including a client system 56 using a telephone link. Fax server 28 is configured to communicate with other client systems 38, 40, and 42 as well.

Utilizing the systems of FIGS. 1 and 2, highly efficient and non-intrusive near real-time loads are allowed via scheduled mini-batch runs without interrupting user queries. The process is based on standard ANSI SQL, therefore it is applicable to any database platform, leveraging database management system (DBMS) power, providing super-linear scalability, particularly on massively parallel processing (MPP) architectures, and requires no data processing on external servers (e.g., the SQL can be invoked from anywhere). In one embodiment, the data warehouse loading is completely metadata-driven at run-time through the use of primary key definitions and table names as parameters. Another advantage is that schema changes do not require a re-compile or re-start of the change data capture system, and only one operation parameter is needed (explicit or implicit delete form). Otherwise, any interface type can be handled, and all tables within the data model (a valid time is included in every primary key) can be handled, with a single program. Only candidate rows are required as input (columns+valid timestamp), no identification of what, if anything, has changed is needed as an input to the change data capture system. For snapshot interfaces, no identification of deletion is needed. Ties in valid times are broken within a primary key with extremely short sequencing times within and across data sets and multiple invocations. Back-dated and/or historical updates are handled by updating the time sequencing of both incoming and existing data.

The above mentioned improvements are realized over existing solutions because the existing solutions are oftentimes customized to the interface type and typically are entirely hard-coded for each column in each table. In addition, existing approaches to temporal sequencing are single row-at-a-time, and not en-masse via set-SQL (relational algebra of set operators). Therefore these solutions do not scale super-linearly as the change data capture system does. For example, 1,000 rows is not 10× longer than 100 rows to process. No data leaves the database during processing, the invocation form of the change data capture system can be external (e.g. Perl) or an internal database procedure.

The described embodiments reduce and potentially eliminate any development costs associated with identifying changes (insert, update, delete, re-statement, historical update, etc.) and, applying changes to a temporal data warehouse that retains history via the time period defined by begin-end valid timestamps. An efficient and very scalable design is described, leveraging the DBMS engine and architecture with set-SQL, unlike existing solutions which use inefficient cursors (row-at-a-time), external data load servers and generate associated network traffic. The highly non-intrusive design allows continuous queries while loading via a very quick set-SQL apply transaction maximized for efficiency (same structure of final stage and target to minimize workload and maximize throughput within the DBMS).

As further described herein, the embodiments are implemented as a sequence of SQL-generators which return the SQL to execute at run-time by querying against the database catalog (for column name and basic data type information) and the primary key metadata table. The below described sequence of steps analyzes, prepares and then applies candidate rows into a target database in a single efficient transaction. These steps can be implemented in any programming, scripting or procedure language with access to execute the SQL generator against the database, fetch the resulting SQL statement, and then execute that fetched statement against the database.

The following includes definitions for certain terms and abbreviations utilized herein. Primary key (PK) is a full Primary Key as defined in a data modeling tool for the normalized temporal target table (represented herein as a target database layer referred to as noncore), always including a source system starting time stamp column called SOURCE_START_TS (available in the database view CDW_PK_COLS_V), which supports the retention of history. The source timestamp represents the start of a period of validity of the row in the authoring system which created it and may be referred to as a creation or last modification timestamp in many systems. PK_Latest is the primary key excluding SOURCE_START_TS, which is typically the Online Transaction Processing System's business key (available in the database view CDW_PK_COLS_LATEST_V). The W_table is the target of stage data transformation, that is, a copy of the noncore table with the 2 pairs of standard begin-end timestamps representing both temporal periods omitted, but with the source system timestamp present and named SRC_START_TS. The X_table is the pre-load table, the source of all rows that are loaded into the target table. The X_table is a copy of the target table with the addition of a column to store the assign action (ETL Indicator) and the two source timestamps named as src instead of source. Noncore is a one layer computer data warehouse corresponding to a single database with uniquely named tables representing the scope of the data warehouse. Other potential database table layers are core (fully integrated 3NF) and derived (e.g. pre-joined, aggregated). All processes can apply to these three layers unless otherwise stated, with derived data sourced potentially from a noncore or core table but still presented as input into a W_table prior to invoking the process.

The systems and methods related to change data capture (CDC) described herein rely on two generated tables in a staging database that are based directly on their target noncore counterparts (X_table and W_table). Additional stage tables may be utilized in the pre-CDC steps to load the W_table. For each target table, there two standardized script-generated variants of the target tables built into the staging area in addition to the stage data tables holding source data built separately. These additional tables are not directly modeled. Instead, these tables are built by script at build time and included in the noncore build scripts. A standard script creates and names each table as is described herein.

As mentioned above, two of the CDC common table structures include a W_table, and an X_table. The W_table is the target table for all stage transformation prior to invoking the CDC system, except for explicit deletions. The X_table is the direct source of all target data and is loaded from either the W_table or via potentially external processes in the case of explicit or cascade deletes. An apply phase of the CDC system adds or uses ETL indicator codes in the X_table such as I, O, U, and D which are defined elsewhere herein. The codes associated with the CDC system are initialized or set when moving the data from the W_table to the X_table and further updated within the X_table prior to controlling the final application of change to the target database.

As mentioned in the preceding paragraph, extract, transform, and load (ETL) indicators include I, U, O, and D, and each is associated with one or more target noncore table actions, such as loading a new target row or ending a time stamp on an existing row. For ETL indicator I, the noncore action is insertion of a new row, and the new target row ending time stamps are NULL (latest row, no end of period validity) until superseded or logically deleted. For ETL indicator U, the noncore actions are insertion of a new row, an update to the noncore latest row ending timestamp (if not already expired) to the earliest U row start timestamp that is within the primary key (PK) in the X_table. Any end timestamp only comes from other X_table records. The new target row ending time stamp for indicator U is NULL if the latest row is within the PK in the X_table, or the start of the next X_table row. Unless a time period gap is explicitly set via a logical delete or otherwise specified in advance, the end timestamp or end period a row is implied by the starting timestamp of the subsequent row within the primary key. Thus the default ending timestamp or period of validity of new rows is 'until superseded'.

For ETL indicator O, the noncore actions are insertion of a new row that is an out of sequence update, in that it is not the latest start timestamp within the latest primary key (PK_Latest), or it is the latest row but its start timestamp is older than the latest expiry within the primary key. In either case, the row will get an end timestamp (pre-expired), either in the X_table or after loading into noncore. For indicator D (logical delete), the noncore actions are an update of the latest noncore row or prior X_table (if immediately prior), a setting of the end timestamp only from starting timestamp of X_table row. The row does not directly load. The new target row ending time stamp for indicator D is initially NULL as it is later populated with the start timestamp of the row to be deleted.

The change data capture process operates based on the defined standardized schema process to build work tables, namely the generic form of the W_tables and X_tables and the availability of the primary key metadata via 2 views noted earlier.

With regard to a functional summary of the change data capture process, a source-system specific transformation process per noncore, derived and any other associated data load, through transformation and loading of the source data into the W_table (in the stage database) from the staging tables is done prior to invoking change data capture, with the exception of explicit delete messages. The process of loading W_tables typically will be independent for each table but this is subject to change based on the exact transformation process.

In one embodiment, W_tables and X_tables are emptied prior to the beginning of each CDC run for a source system. Change data capture loads data from the W_table into the computer data warehouse (CDW) data layer (e.g. noncore) via the X_table (except for explicit deletes). This process is parallelized to the extent possible across target tables and has no inter-dependencies.

The CDC system apply phase loads to each target table in a single database transaction using set-SQL in a minimum of time (typically a few seconds or less). These transactions are parallelized across tables to the extent possible and have no inter-dependencies. The change data capture system and methods described herein relate to a mini-batch design that allows flexible rapid loading of CDW without disrupting reporting. No database utilities are used to load the target tables. For a given source system or set of related tables, the entire batch run typically must be completed before initiating a new batch run (no parallelizing or overlapping of the CDC-related portion of the data load).

The CDC system only updates the two standard ending timestamps (source or valid and transactional or ETL) of existing target rows, with the source ending timestamp (source_end_ts) typically being set only to the source system specified deletion timestamp (for deletes) or the source start timestamp of the subsequent row, except for gaps created by logical deletes. All new data (any new key or non-key attribute value) results in a new target row. No other CDW columns may be updated in target tables by the CDC process, as all source data columns in the target table are considered read-only.

The CDC system ensures the uniqueness of the primary key per computer data warehouse metadata loaded directly from the data model. No active integrity constraints are assumed or required to be implemented, therefore a passive checking script is typically run as a further validation. The CDC system also ensures that all timestamp ranges are valid, for example, the ending source or valid timestamp is greater or equal to the starting timestamp, that within PK, that the source starting timestamp is equal to the source ending timestamp of the prior row except for deletions and that the source ending timestamp is null for the latest row within a primary key unless logically deleted.

The CDC system populates all four standardized timestamps representing both temporal time periods, with the source starting timestamp being the only timestamp always populated from the source data row (named SRC_START_TS in W_tables and X_tables). The source ending timestamp attribute is also obtained from the source by way of the start timestamp of the next row within the primary key with unique content or the deletion time of the current row, but can be null when a row represents the latest information. The two CDW timestamps reflect the actual load time (transaction time) but typically are standardized for a given mini-batch run for a given table (obtained just ahead of the load and set as a fixed value to allow easy identification of all rows loaded in a given mini-batch run for a given table). The CDC system also collects or refreshes statistics after each table is loaded (W_table in pre-CDC, X_table after Step 102, and target table after apply step 206 as described further below). The change data capture system also can invoke passive primary key uniqueness and foreign key integrity checking, if not separately invoked, per functional requirements.

In the CDC system implied parent to child delete is present only as a place-holder to show the process flow that must be accommodated. Variations needed by complex stage transformation and mixed model publication (push and snapshot for one table) are not addressed. As noted, any explicit and any complex implicit deletes must be loaded into the X_table prior to the start of CDC by source system specific transformation code. The CDC system allows a deleted record to be re-born, even in the same batch. This can typically be detected when noting that the source's starting timestamp is greater than the prior record's source ending time stamp, which is only indicative of a delete.

In the preferred implementation of the CDC system, non-core new row count is equal to noncore old row count+I+O+U counts. Count updates (O and U are separate) are validated against counts of O and U in X_table where the ending timestamp is not null.

As common code, the CDC system and process is configured to work for any source system the CDW needs to process without any hard-coded differences. As noted elsewhere herein, there are four steps which apply to only one of the fundamental interface types (snapshot or message-based), while all remaining steps apply to both.

Figure 3:
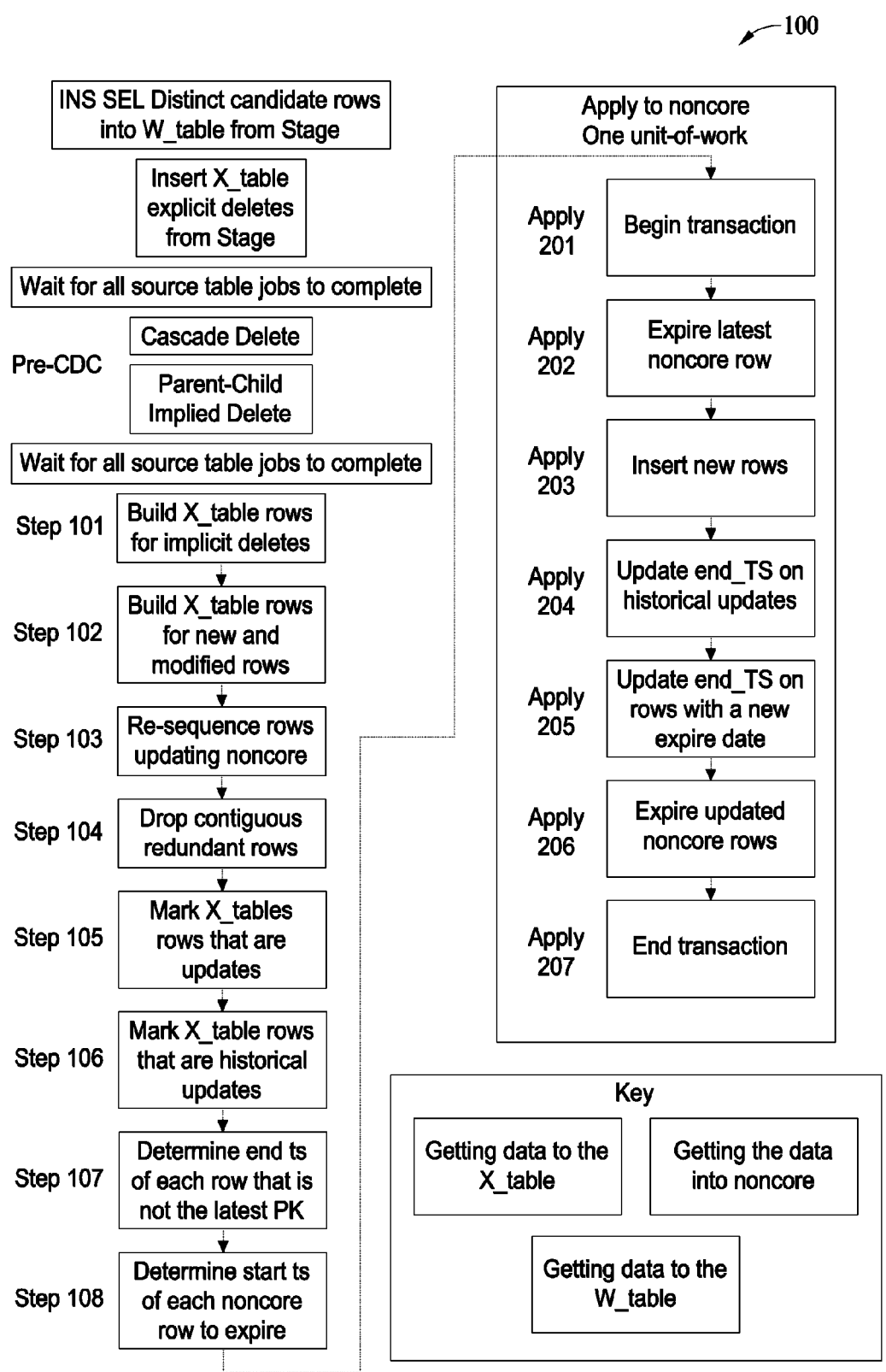
FIG. 3 is a flowchart illustrating a change data capture process.

Now referring to FIG. 3, which is a flowchart 100 illustrating the change data capture process, the building of X_table rows for implicit deletes (Step 101) is invoked only when a complete snapshot of source data is available and only for tables that do not depend on a parent table for their existence. These later cases are the parent-child implied delete. Step 101 is an implicit delete step, and deletion is determined by detecting that the latest primary key (PK_latest) that is the active row in noncore (end timestamp is null) and is no longer in the incoming snapshot and thus is presumed to have been deleted in the source system since the last data feed. In one embodiment, the current database timestamp is inserted into SRC_START_TS so that a single apply step, as further described below, can handle implicit and explicit deletes. This timestamp becomes the ending timestamp in the target table. Since there is no trigger or deletion time from the source system, the current timestamp is used as the presumed delete time in the source system.

Separate modules are provided based on applicable prerequisites, with invocation being once per target table utilizing the related W_table and X_table. For example, Steps 101 through 108 described herein require that all W_tables that are related to a source system be fully loaded prior to the initiation of processing, in the event that there are interdependencies amongst the incoming data.

There is no limitation on comparisons to consider only the latest noncore data rows (source_end_ts is null), the use of the functional equivalent of the SQL Except operator considers all noncore rows. As illustrated at step 102, this allows non-key attribute changes to be updated into the target table (with a corresponding ins addition to the source start TS (time stamp)). For example, should a job failure lead to the need to re-run a job, which updates a column in the W_table but not the source starting timestamp, the change data capture system detects the new non-key attribute and inserts a new row into noncore with a sequenced source start time stamp to be unique. In any case, any new source start timestamps for a given primary key also results in new rows provided the non-key attributes differ from the immediately prior row of that primary key, if any, considering both the incoming and existing data.

The within timestamp re-sequencing portion of step 102 can potentially be omitted, but only if the source system absolutely guarantees unique business keys excluding the source start timestamp. The minimum time increment, for example one nanosecond, is added to the source start timestamp of subsequent rows which have an identical primary key with no further sequencing done, relying on an ordering function within the PK, such as the equivalent of the row_number ( ) function. Timestamp re-sequencing is utilized to initially guarantee a unique primary key (with the timestamp) so that update processes are ensured of a one-to-one row assignment. Some of the rows that are sequenced may be subsequently deleted due to not having distinct non-key attribution (see step 104). With the oldest such row retained, this minimizes the likelihood of new sequencing being introduced (the oldest row has no time added to it). Collecting or refreshing statistics on the X_table in step 102 may be important to obtain good load performance.

Step 103 sequences duplicate full primary key's between the X_table and noncore (within X_table sequencing was done in Step 102) for insert candidates (excludes deletes). By adding a value starting with one greater than the largest sequence contained in the otherwise unused last three digits of the six sub-second timestamp digits, it is ensured that the primary key is unique and sequenced across both existing and prospective data rows. Newer mini-batch loads receive a new timestamp each time and potentially represent the latest record if the significant portion of the timestamp is unique. Step 103 is a prerequisite for steps 104 and beyond, and eliminates the primary key equality case, since it would be sequenced into a unique timestamp if it had new content. Delete records are excluded. In addition, the "stem" (all but the last three sequenced digits) of the timestamp must be used for subsequent 'group by' operations to allow multiple primary key values differentiated only by timestamp to be sequenced.

Step 104 is utilized to delete candidate W_table rows that contain no new key or non-key attribution other than the source start timestamp, when compared with the immediately prior row sorting by source start timestamp within the Primary Key. This step represents the compression unit of the process, commonly referred to as temporal normalization. Since the computer data warehouse stores temporal effectivity as a begin-end timestamp range or period, knowing that an identical incoming row is still in effect is not new information provided it is the latest row in noncore. Similarly, knowing that two identical rows in the W_table have consecutive but different start times is also not new information, the start time of the earliest row captures this content already in the period between the start and end timestamps, once the end timestamp is assigned in the case of incoming data. The SQL statement itself can be quite large if a table has many columns, particularly with the need to check for null values on either side of the comparison. While one commonly utilized system includes a limit of 1 MB per statement, other tools may impose a smaller size limit which may require multiple steps to decompose the non-key attribute comparisons into execution units of reduced complexity or size. Null protection is provided via a Coalesce function when comparing all of the optional columns (generally all non-PK's). The use of a row_number function relies on the distinct source start TS between the X_table and noncore which is ensured by step 103.

Step 105 is the first of two steps that update the extract, transform, and load (ETL) indicator for candidate insert rows ('I'), in this case from 'I' to 'U' for newer updates. By "newer", the primary key, including source start time stamp, is newer that then latest row within the same PK_latest in noncore, even if flagged as deleted. This step can update the ETL indicator of more than one X_table row within a primary key, provided each represents new content and was not removed in step 104. Only the latest active noncore row's ending timestamps will be updated in the apply phase (step 202 below) which seeks out only the earliest 'U' row per PK to apply its start timestamp as the ending timestamp of the latest noncore row.

Step 106 allows for new historical rows to be added to the computer data warehouse. This step is the second of two steps that updates the ETL Indicator for candidate insert rows ('I' or 'U'), in this case from 'I' or 'U' to 'O' for updates to 'older' data. There are two cases of "old" updates with ETL Indicator of 'O': 1. The source start timestamp is prior to the latest noncore row within the same PK_latest, even if flagged as deleted, which is also referred to as an out of sequence update; and 2. Case 1 is not met, so the start timestamp is newer than any row in PK_latest in noncore, but the start timestamp is also less than the latest ending timestamp in noncore. In other words this row is a newer update but will be already logically deleted and marked expired once input due to the later expiry date already in noncore. By definition this row is not a deletion of the latest row and is already flagged as 'U' due to its starting timestamp being newer than the latest noncore start timestamp.

Step 107 provides ending timestamps when there is more than one row set to 'U' per primary key in the X_table to reflect that all but the latest row will be inserted into noncore pre-expired. Step 107 sets the ending timestamp of all pre-expired new rows which are not destined to become the latest row in noncore. All rows with the ETL indicator 'O' need an ending timestamp and only those rows with ETL indicator 'U' that are not the latest in the X_table and noncore will also get an ending timestamp equal to the start time of the next row. The 'O' rows get their ending timestamp from the subsequent noncore row, by definition, in the Apply phase (step 204 described below). This step can be accomplished in a single SQL statement by use of the union or exception operator.

Step 108 sets the exact starting timestamp of the row to be logically deleted for all delete rows ('D' ETL indicator) in the X_table and stores this value in the src_end_ts column of that row. This provides an exact full primary key for the Apply phase (step 206 described below) to locate a single noncore row to expire by finding the prior row from noncore and the X table rows to which the delete would apply. The latest row and other pre-expired X_table rows will be updated but it is not required and other CDC steps already expire these rows. By definition the source ending timestamp of delete rows is the source start timestamp of the row to expire and is destined to become the end timestamp of the row that was in existence at that time. Step 108 is also required to maintain referential integrity when the pre-CDC steps determine cascade and implied delete of children. This ensures that parent records have corresponding historical deletes applied to them without the pre-CDC process having to know the exact timestamp prior to invoking CDC.

The apply phase steps (201-207) described below are run together as a single database transaction for each target table, with one initiation per target table. All of steps 201-207 can be combined into a single multi-statement request, provided error checking and row counts arrays are properly handled. If the steps are submitted individually and a step encounters an error, no further SQL should be submitted. The entire transaction will automatically be rolled back. The database session must be in a transaction mode to run this SQL in this manner. Depending on the source transformation requirements, it may be necessary to wait for all source tables to be completed in steps 101 through 108 before starting any apply steps (201-207). The apply steps are ideally run in parallel for all applicable tables to maximize the referential integrity of the target database during continuous query access.

More specifically, apply step 201 ensures that all subsequent SQL statements up until apply step 207, the END TRANSACTION step described below, are fully applied or applied not at all in the event of an error anywhere within the statements. This is necessary to leave the target table in a valid condition, for example, at most one source ending timestamp per PK_latest, at most one active row, unless that row has been logically deleted.

Apply step 202 updates the one latest active row (source ending timestamp is null) per PK_latest to set both ending timestamps (source and CDW) to mark the row as logically deleted for the ETL indicator 'U', which causes the latest noncore timestamp to be expired due to the arrival of newer row(s). Processing of all Deletes or indicator 'D' occurs in apply step 206. The conditions applied in step 202 includes that the X_table source start timestamp (becomes the ending time) is at least as large as the noncore start time (period>0).

Apply step 203 is the only apply step to insert new rows to noncore. All ETL indicators except delete result in new noncore rows (I, O and U). Rows may be pre-expired (via the X_table source ending timestamp column having a value) or not. As in any step which can assign a transactional or CDW timestamp, this value represents the current timestamp of the apply phase, typically determined prior to the apply steps and used consistently in each, so that a constant start CDW timestamp also uniquely identifies an invocation of CDC on the target table.

Apply step 204 corrects the ending timestamp of the prior noncore row when the new row inserted in apply step 203 (one case of the 'O' row) has the latest source start timestamp but that timestamp is earlier than the latest source ending timestamp already in noncore. This is a relatively rare case of the 'O' row, that of an already expired row receiving an out of sequence update with a starting timestamp less than the existing expiry timestamp.

Apply step 205 is invoked for rows marked with the ETL Indicator 'O'. Step 205 joins all X_table 'O' rows to the noncore table to determine the immediately prior noncore row, if any, and then update these rows with the start timestamp of the X_table row as the ending timestamp, as well as updating the CDW ending timestamp. Apply step 205 completes the process of ladder stepping the source timestamps for out of sequence new rows to provide distinct non-overlapping time periods in the source timestamp. Except for any rows marked as logically deleted, the source start timestamp is always the source end timestamp of the immediately prior row (if any) when sorted by source start timestamp within the rest of the primary key.

Apply step 206 is invoked for rows marked with the ETL Indicator 'D' and applies to both historical and current rows from noncore or newly loaded in the batch. This process updates the existing ending timestamps in noncore to the starting timestamp of the delete row (ETL indicator='D'). For rows directly inserted into the X_table (parent-child implied delete), the pre-CDC process that builds the row must ensure that the ending timestamp is still greater than the start timestamp and less than or equal to the subsequent row's source start timestamp.

To ensure one-to-one joining, the source start timestamp of the noncore target row is stored in the src_end_ts column in the X table since the source starting timestamp in the X table is already used to record the source timestamp of the Deletion event, which in the target table becomes the ending timestamp of the row. This final condition embodied in step 206 covers logical deletion of the latest noncore rows and covers historical deletes to ensure that when updating the ending timestamp that the new ending timestamp is less (can shorten the lifespan or period of a row only, not lengthen it, to ensure no overlap of source timestamp start and end periods across rows within a PK_latest).

The final apply step 207 submits the SQL statement for ending a database transaction, which concludes the transactional scope of all prior statements since the prior begin transaction, provided there were no errors. If not already done statistics should be collected or refreshed on the target table at this time.

Figure 4:
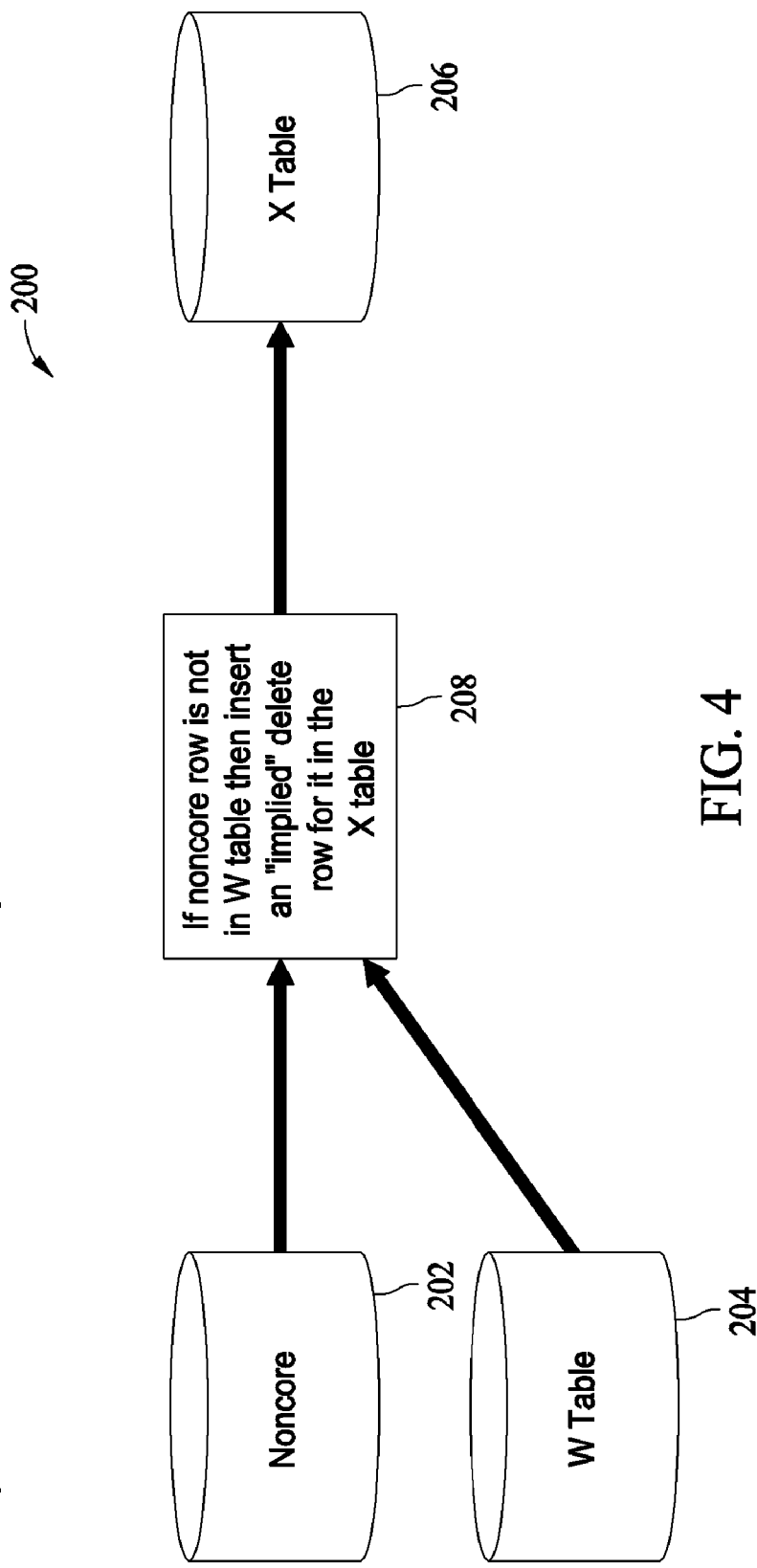
FIG. 4 is a data flow diagram associated with the building of X_table rows for implicit deletions.

FIGS. 4-16 are data flow diagrams that further explain each of the steps associated with the described change data capture system. For example, referring to FIG. 4, which is associated with step 101, the building of X_table rows for implicit deletes, data diagram 200 illustrates that if a row from the noncore data 202 no longer shows up in the W_table 204, it is assumed that it has been deleted from the source. The X_table row 206 is inserted 208 with the latest primary key (PK_latest) from the noncore data 202, the current timestamp, and the ETL_Indicator 'D' where a "current" noncore primary key is not in the W_table 204. This is the simple case where a table does not depend on a parent.

The following is an example of pseudo code that is associated with step 101.

```
Step 101   Pseudo Code:
Insert into X_table
  Select PK_Latest, Current_Timestamp, 'D' from
  noncore
  WHERE PK_Latest NOT IN
  ( Select PK_Latest from W_table) ;
```

Figure 5:
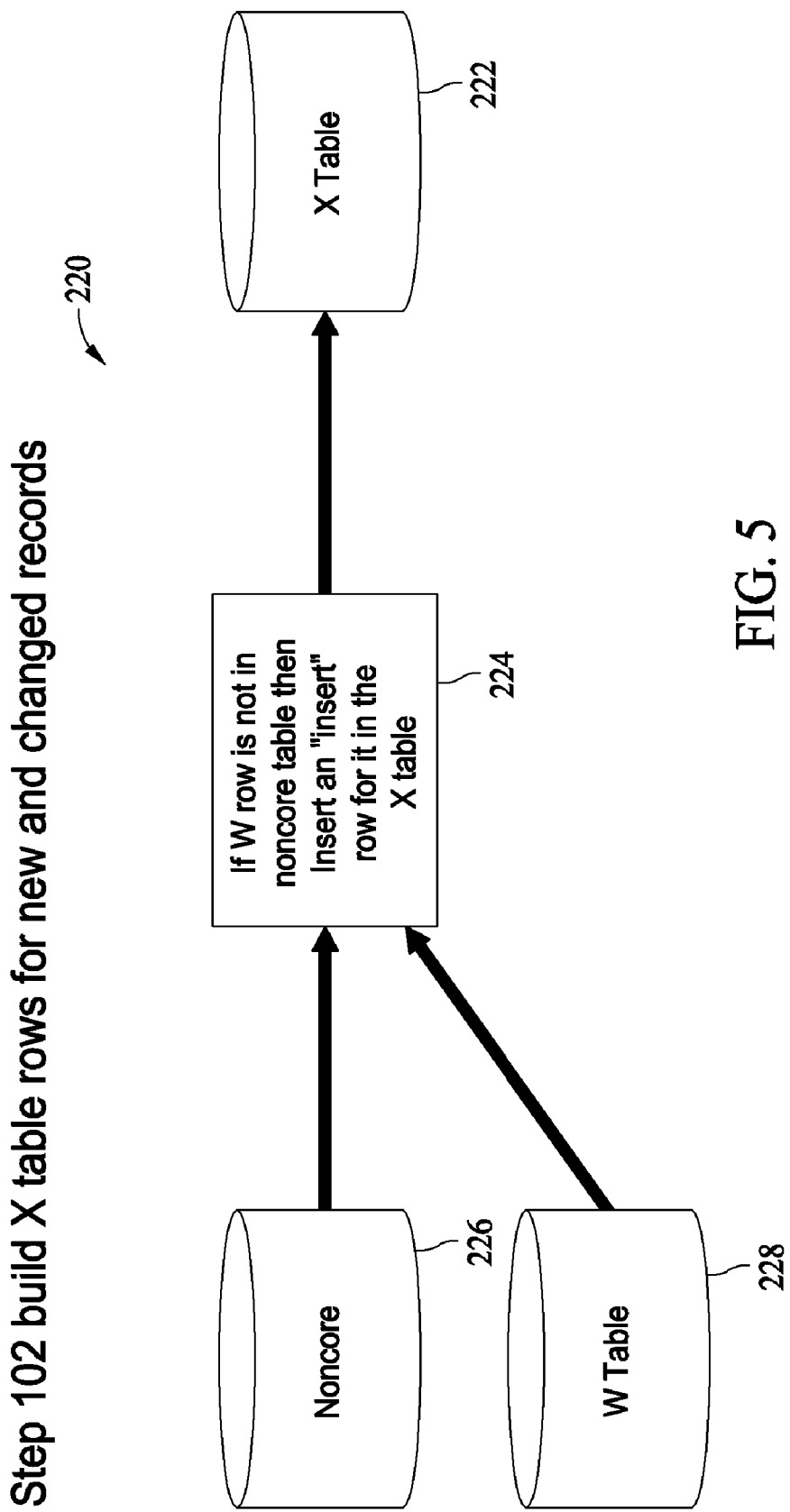
FIG. 5 is a data flow diagram relating to the building of X_table rows for new and changed records, the sequencing of non-distinct full primary keys, and the collecting of statistics on the X_table.

FIG. 5 is a data flow diagram 220 relating to step 102, the building of X_table rows for new and changed records, the sequence of non-distinct full primary keys, and the collecting of statistics on the X_table 222. The rows are inserted 224 to the X_table 222 if at least one column is different from all other rows in the noncore data 226, which allows new data history to be loaded into the X_table. By selecting all W_table 228 rows minus (SQL except) all noncore 226 rows, the default ETL indicator is set to I. The change data capture system, and primary key integrity, requires such a step, which may not always be needed if guaranteed in the data. One nanosecond is added to the src_start_ts timestamp in W_table 228 for the second to nth rows within the PK_latest. Similarly the last three sub-second digits of the source timestamp, which are reserved for any timestamp sequencing, are excluded from the change comparison between W_table and noncore The following is an example of pseudo code that is associated with step 102.

```
Step 102    Pseudo Code:
Insert into X_table
Select [*] from W_table    -- 1ns sequencing added to start TS
Where * not in (   -- exclude ns sequencing when selecting start TS
Select [*] from noncore);    -- exclude ns sequencing when selecting start TS
Collect statistics on X_table;
```

Figure 6:
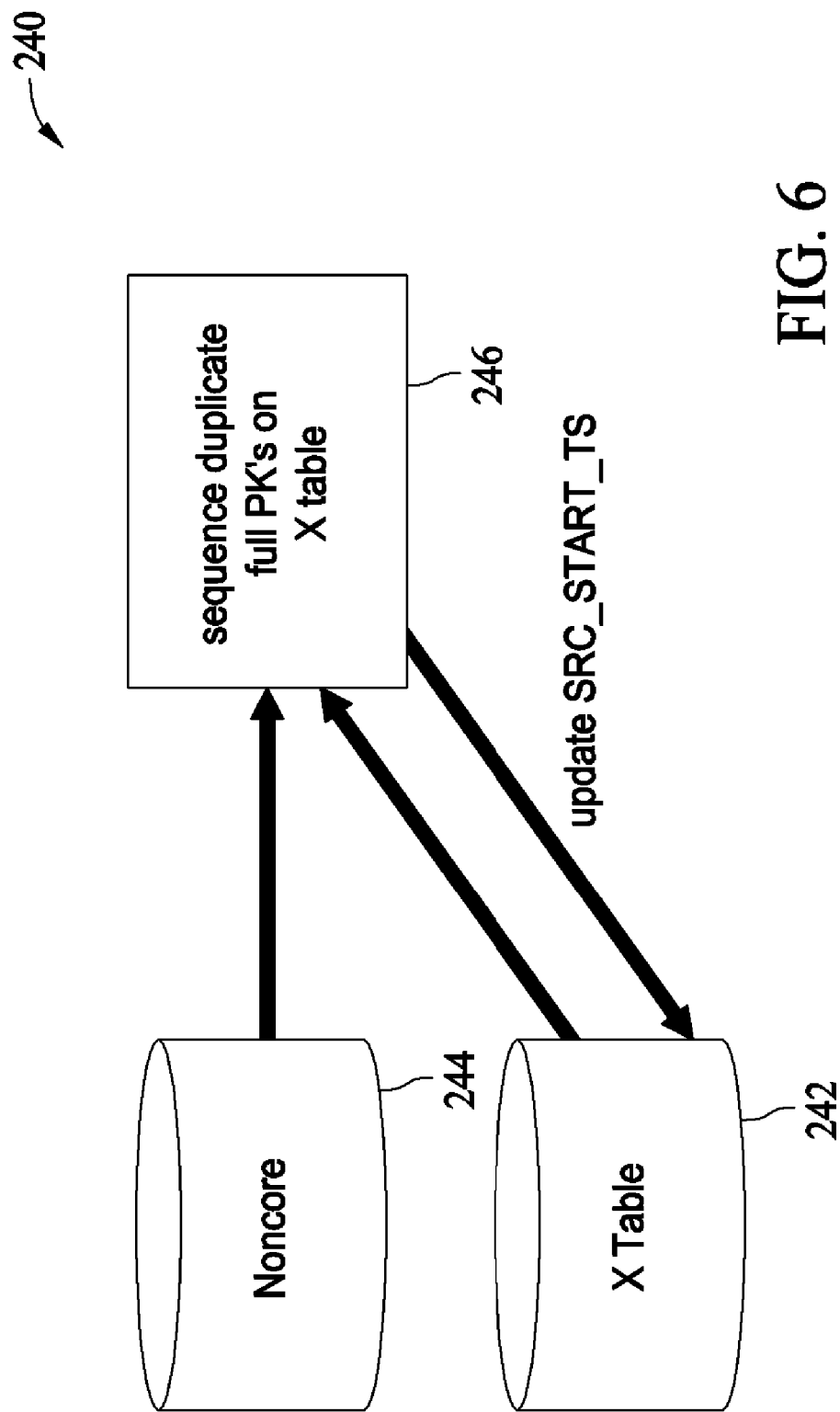
FIG. 6 is a dataflow diagram illustrating the re-sequencing of X_table rows which will in turn update the time sequence of existing noncore rows.

FIG. 6 is a dataflow diagram 240 illustrating the re-sequencing of X_table 242 rows which will in turn update existing noncore 244 rows. The intent of step 103 is to update the source starting timestamp associated with the X_table 242 by adding a maximum noncore timestamp (TS_nanoseconds) to all X_table 'I' rows with otherwise identical start timestamps (excluding last 3 sub-second digits) within the same PK. If new, sequenced (in step 102) rows 246 for a primary key (PK) are received, having the same timestamp (TS) as existing rows, it is ensured that the new rows fall in sequence after the noncore rows 244.

```
Step 103    Pseudo Code:
UPDATE        X-alias
 FROM X_table    X-alias
, ( SELECT
    PK_Latest
  , CAST ( MAX (src_start_ts) as char(23) ) F23C
  , substring ( cast (max(source_start_ts) as char(26) ) from
    24 for 3 ) + 1 L3C
  , substring ( cast (source_start_ts as char(32) ) from 27 for
    6) + 1 L3C
  FROM noncore
   GROUP BY PK_Latest ,F23C,TSTZ ) QQQ
SET SRC_START_TS = F23C ||
  substring(CAST((L3C / 1000 + (substring( cast ( X-alias.src_start_ts as
char(26) ) from 24 for 3 ) ) / 1000) AS DEC(4,3) ) from 4 for 3)
  || ( substring( cast ( X-alias.src_start_ts as char(32) ) from 27 for 6))
 WHERE   X-alias.PK_Latest = QQQ.PK_Latest
 AND     CAST ( X-alias.src_start_ts AS CHAR(23) ) = QQQ.F23C
 AND     X-alias.ETL_INDICATOR = 'I' ;
```

The preceding is an example of pseudo code that is associated with step 103.

Figure 7:
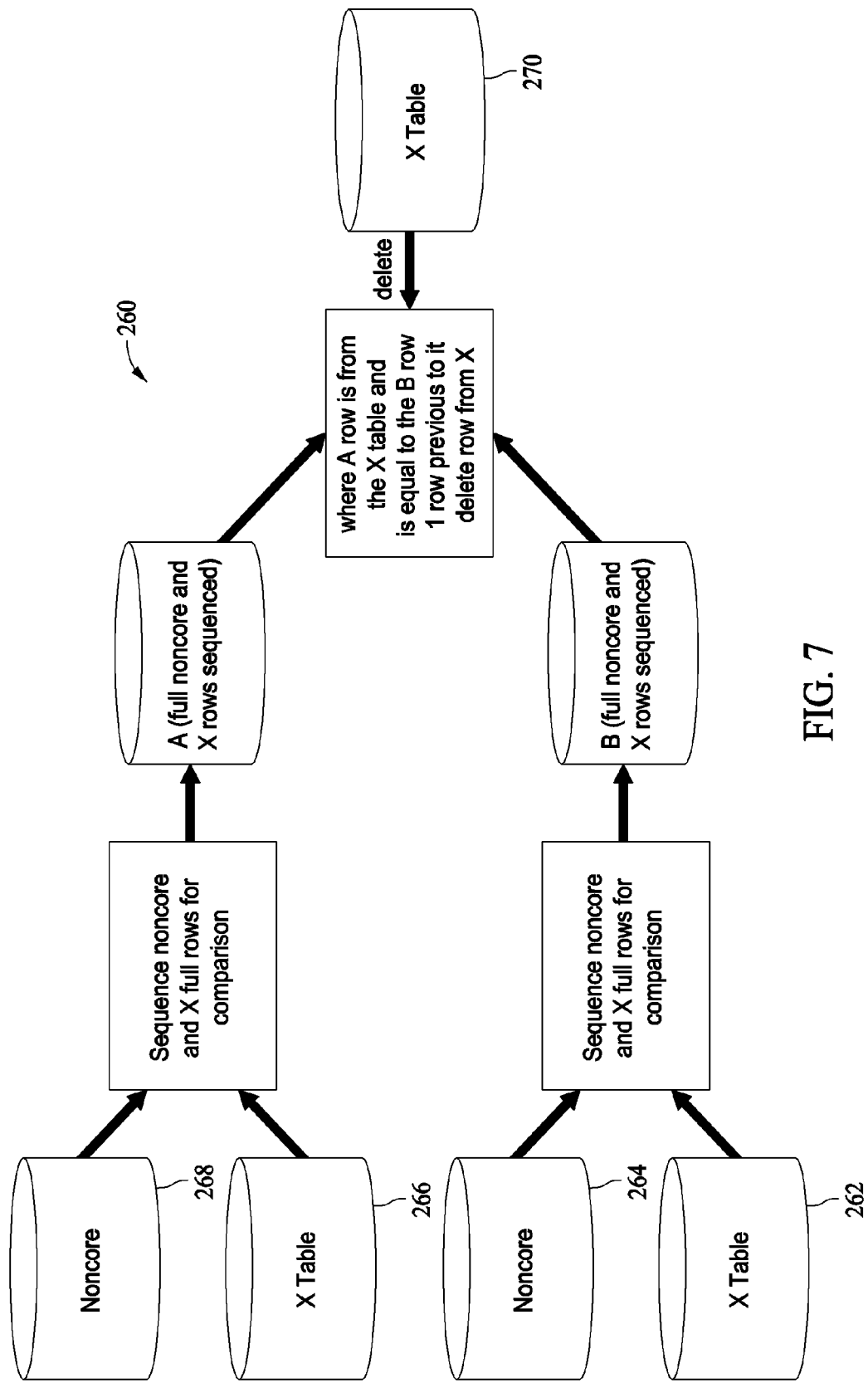
FIG. 7 is a data flow diagram illustrating the dropping of contiguous redundant X_table rows within a union of an X_table and a noncore table.

FIG. 7 is a data flow diagram 260 illustrating the dropping of contiguous redundant X_table rows, within a union, for example, of the X_table 262 and noncore table 264 and additionally a union of X_table 266 and noncore table 268. The two unions are joined on primary key to sequence rows and allow detection of consecutive rows duplicated as to all non-key attribution. Step 104, recognizes that resources are wasted when a row including the same data is loaded more than once and implements the temporal time period compression unit. However, it is still desirable to record any changes in the data from "A" to "B", then back to "A". Therefore, the first instance of each distinct row, excluding the starting timestamp, is maintained in the X_table 270. More specifically, data within X_table 270 is deleted if PK_latest is the same, and if all columns except the timestamp are same as the preceding row when sorted by a source starting timestamp within PK_Latest, within a union of the X_table and noncore table.

The following is an example of pseudo code that is associated with step 104.

```
Step 104   Pseudo Code:
Delete from X_table where PK IN (
(Select PK from
(Select A.* from
 (Select *, table_source, Row_Number( ) from X_table union noncore
   partition by PK_Latest Order by SRC_START_TS to
   create Row_Number) A
INNER JOIN (Select *, table_source, Row_Number( ) from X_table
   union noncore partition by PK_Latest Order by SRC_START_TS to
   create Row_Number) B
Where A.PK_Latest = B.PK_Latest
and B.Row_Number = A.Row_Number – 1
and all non-key attribute are the same (values equal or both null)
)
AND A.Table Source = 'X'
AND ( B.Table Source = 'X' OR
 (B.Table Source = 'Noncore' AND
  (A.SRC_START_TS < B.SRC_END_TS or
B.SRC_END_TS IS NULL)))
AND ETL_Indicator <> 'D';
```

Figure 8:
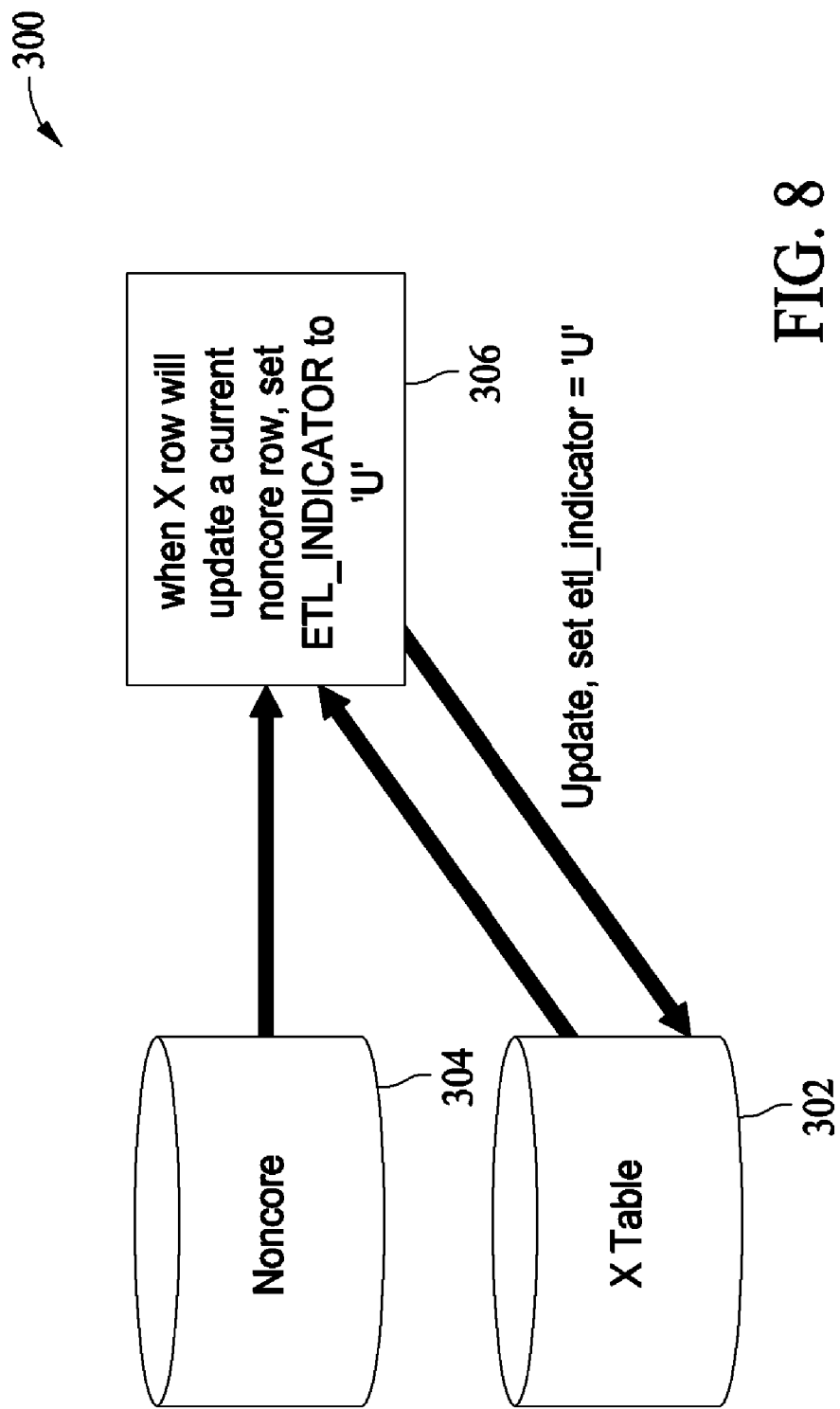
FIG. 8 is a data flow diagram illustrating the marking of rows of X_table which are updates to current rows within the noncore data.

FIG. 8 is a data flow diagram 300 illustrating the marking of rows of X_table 302 which are updates to current rows within the noncore data 304. In step 105, to update 306 the X_table, the ETL_Indicator is set to 'U' on 'I' rows that update existing noncore "current" rows, where the incoming source timestamp is greater than the latest source timestamp in the noncore table. In the apply step 202 described herein, the starting timestamp of the earliest of these "U" rows is used within a primary key to expire the latest noncore row.

The following is an example of pseudo code that is associated with step 105.

```
Step 105      Pseudo Code:
UPDATE     X_tbl
 FROM      X_TABLE      X_tbl
   ,       (select PK_Latest
   ,       max(src_start_ts) src_start_ts
           from NONCORE
           group by PK_Latest )    NC_tbl
 SET ETL_INDICATOR = 'U'
 WHERE X_tbl.PK_Latest  = NC_tbl.PK_Latest
   AND  X_tbl.SRC_START_TS   > NC_tbl.SRC_START_TS
 AND X_tbl.ETL_INDICATOR = 'I' ;
```

Figure 9:
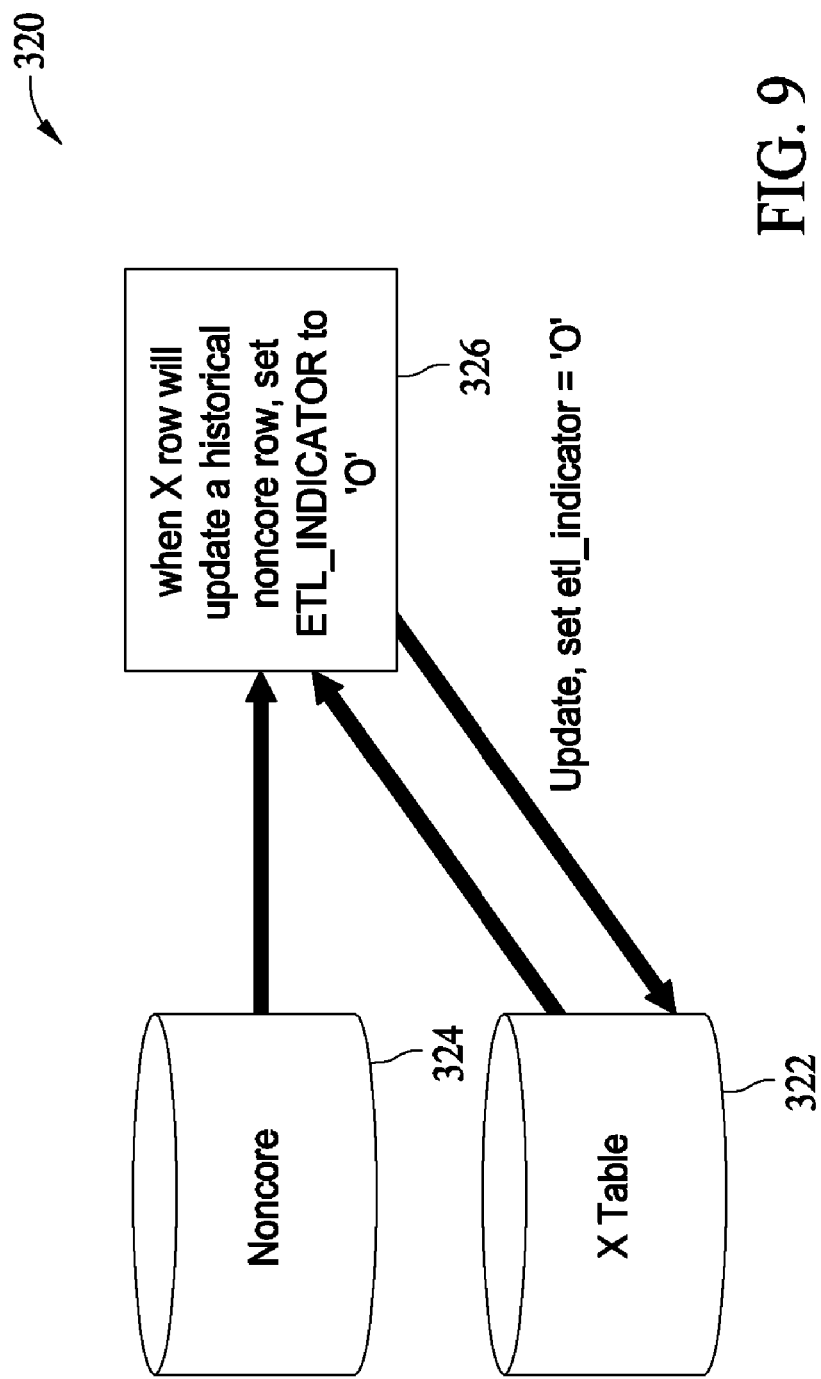
FIG. 9 is a data flow diagram illustrating the marking of rows in the X_table which are updates to a historical row in the noncore data.

FIG. 9 is a data flow diagram 320 illustrating step 106, the marking of rows in X_table 322 which are updates to a "historical" row in the noncore data 324. Flow diagram 320 relates to updates that are being applied out of sequence. In step 106, to update 326 data within X_table 322, the ETL_Indicator is set to 'O' in rows previously set to I or U for the updating of existing noncore "history" rows. In such rows, incoming source timestamps are less than the latest source start timestamps in noncore rows, once the entire X_table and noncore table rows are considered. This is achieved by combining timestamp comparisons from both noncore and X_table to achieve an overall maximum per PK_latest. Alternatively, the incoming source timestamp is less than the latest source ending timestamp, therefore the row should be pre-expired. These "O" rows update the ending timestamp in the noncore data to correct a historical sequence. These updates are being applied out of time sequence, so most get the ending timestamp of the next row in step 107. Others get the ending time stamp in apply step 204.

The following is an example of pseudo code that is associated with step 106.

```
Step 106    Pseudo Code:
UPDATE   X_tbl
 FROM     X_TABLE    X_tbl
, (select PK_latest, max(max_end_ts), max(max_start_ts)
  FROM (select PK_Latest, max(source_end_ts) max_end_ts
      max(source_start_ts) max_start_ts from noncore group by
      PK_Latest
   UNION ALL select PK_Latest, max(src_end_ts) max_end_ts
      max(src_start_ts) max_start_ts from X_TABLE
         group by PK_Latest )      Max_tbl (PK_latest, max_end_ts,
         max_start_ts)
   Group by PK_Latest) MAX_TBL (PK_latest, max_end_ts,
   max_start_ts)
SET ETL_INDICATOR = 'O'
WHERE  X_tbl.PK_Latest  = MAX_tbl.PK_Latest
   AND  ( (X_tbl.SRC_START_TS  < MAX_tbl.MAX_END_TS
       OR (   X_tbl.SRC_START_TS   <
       MAX_tbl.MAX_START_TS ) )
AND X_tbl.ETL_INDICATOR IN ('I', 'U') ;
```

Figure 10:
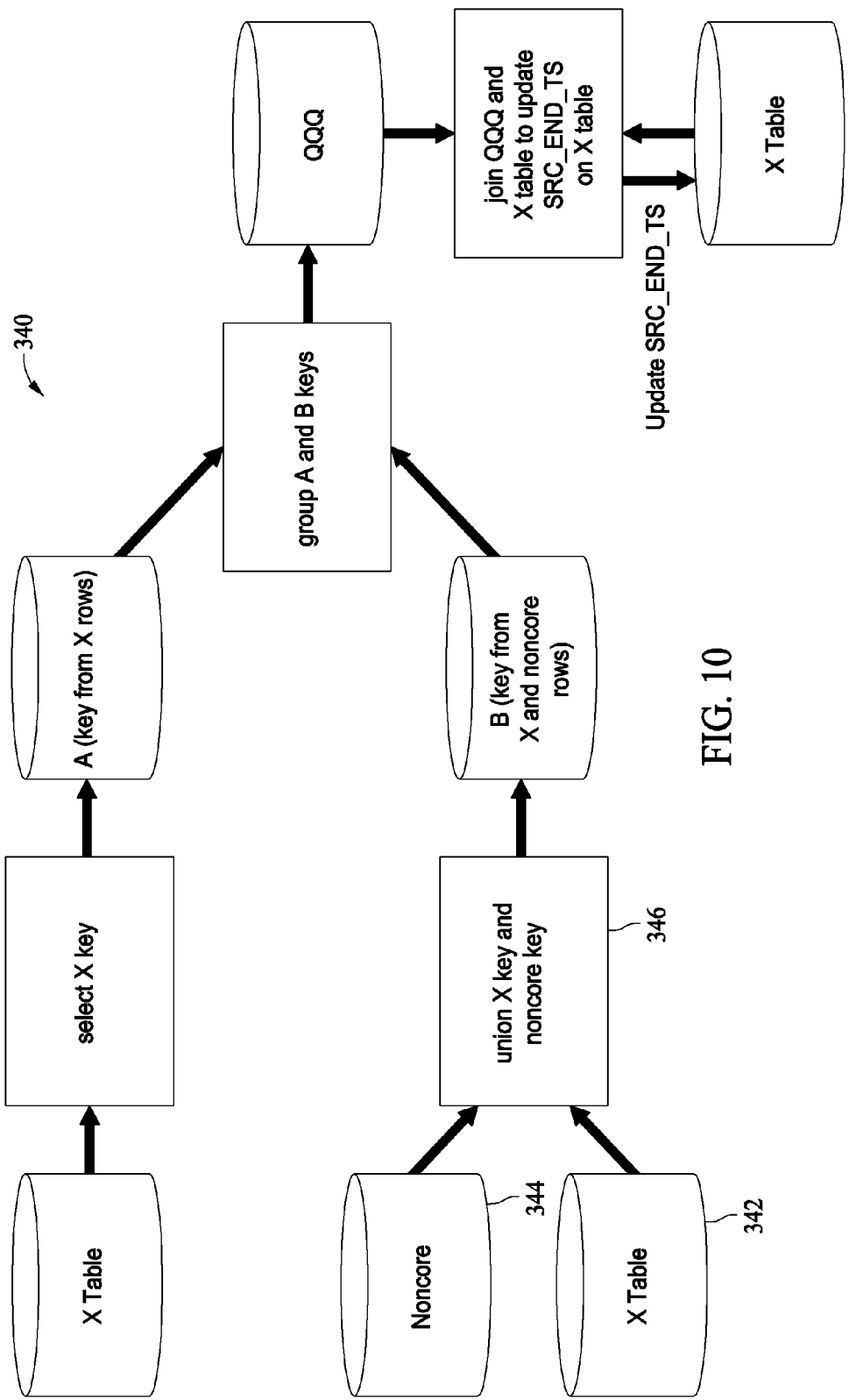
FIG. 10 is a data flow diagram illustrating the expiring of X_table rows that have already been updated in noncore or in the X_table.

FIG. 10 is a data flow diagram 340 illustrating step 107, the expiring of X_table rows ('O' or 'U') that have already been updated in noncore or in the X_table. The ending timestamp in X_table rows is set to the starting timestamp of the prior row (either in noncore or X_table). Rows where the ETL_Indicator is set to 'O' allow for history updates to be loaded. These are incoming rows which are not the latest row within their primary key, that is, they have already been updated, across X_Table 342 and noncore 344 via the union

346. They are inserted into the noncore data as history rows based on their ending timestamp.

The following is an example of pseudo code that is associated with step 107.

```
Step 107    Pseudo Code:
Update  X_table
FROM  X_table
   , ( Select    A.PK, min(B.START_TS) as END_TS
    From ( Select PK
         From X_table )    A,
         ( Select PK
         From X_table
   UNION
         Select PK
         From noncore ) B
      Where B.PK_Latest = A.PK_Latest
         And B.START_TS > A.START_TS
      Group By A.PK
   ) QQQ
SET SRC_END_TS = QQQ.END_TS
WHERE X_table.PK = QQQ.PK
   and X_table.ETL_Indicator IN ('O', 'U');
```

Figure 11:
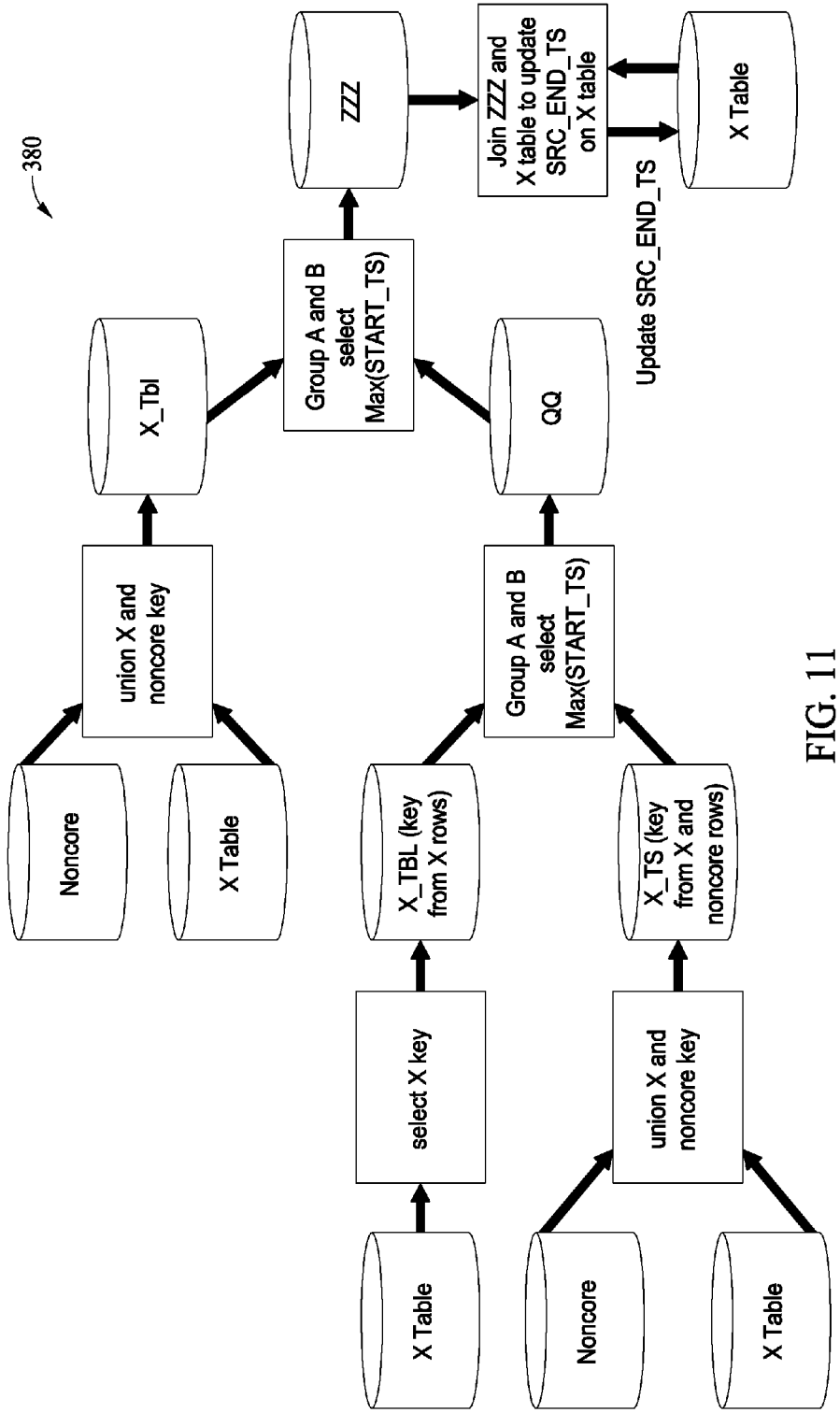

FIG. 11 is a data flow diagram 380 illustrating step 108, the providing of a full key (with source start timestamp) for all delete rows (ETL_Indicator of 'D') by finding the timestamp of the latest noncore row that the logical delete applies to. More specifically, the ending timestamp is set on X_table rows to the starting timestamp of the immediately prior X_table row or noncore row, based on a delete timestamp. These rows to be logically deleted are in addition to already prepared parent-child implied or cascade delete rows prior to change data capture. Such cases are executed in apply step 206.

The following is an example of pseudo code that is associated with step 108.

```
Step 108    Pseudo Code:
UPDATE X_Table FROM X_Table, (
SELECT X_Tbl.PK_Latest, MIN(QQ.SRC_START_TS ) SRC_START_TS, QQ.MAX_START_TS
   FROM (SELECT PK FROM X_table WHERE ETL_INDICATOR IN ('O', 'U')
      UNION SELECT PK FROM noncore WHERE (PK_Latest)
         IN (SELECT PK_Latest FROM X_table)) X_Tbl
   INNER JOIN
      (SELECT PK, Max(X_TS.SRC_START_TS ) MAX_START_TS
       FROM (SELECT PK FROM X_table WHERE ETL_INDICATOR IN ('O', 'U')
         UNION SELECT PK FROM noncore WHERE (PK_Latest)
         IN (SELECT PK_Latest FROM X_table)) X_TS
      INNER JOIN (SELECT PK FROM X_table WHERE ETL_INDICATOR = 'D') X_Tbl
       ON X_TS.PK_Latest = X_Tbl.PK_Latest
         AND X_TS.SRC_START_TS < X_Tbl.SRC_START_TS
      GROUP BY PK) QQ
    ON X_Tbl.PK_Latest = QQ.PK_Latest AND X_Tbl.SRC_START_TS = QQ.MAX_START_TS
   GROUP BY X_Tbl.PK_Latest , QQ.MAX_START_TS) ZZZ
SET SRC_END_TS = ZZZ.MAX_START_TS
WHERE X_Table.PK_Latest = ZZZ.PK_Latest
   AND X_Table.SRC_START_TS = ZZZ.SRC_START_TS
   AND X_Table.ETL_INDICATOR = 'D' ;
```

The first apply step, step 201 ensures that all subsequent SQL statements up until Apply 207, the END TRANSACTION, are fully applied or applied not at all in the event of an error anywhere within the statements. This is necessary to leave the target table in a valid condition (e.g. at most one SOURCE_END_TS per PK_latest, at most one active row, unless that row has been logically deleted).

The following is an example of pseudo code that is associated with apply step 201.

Step 201 Pseudo Code:
START TRANSACTION

Figure 12:
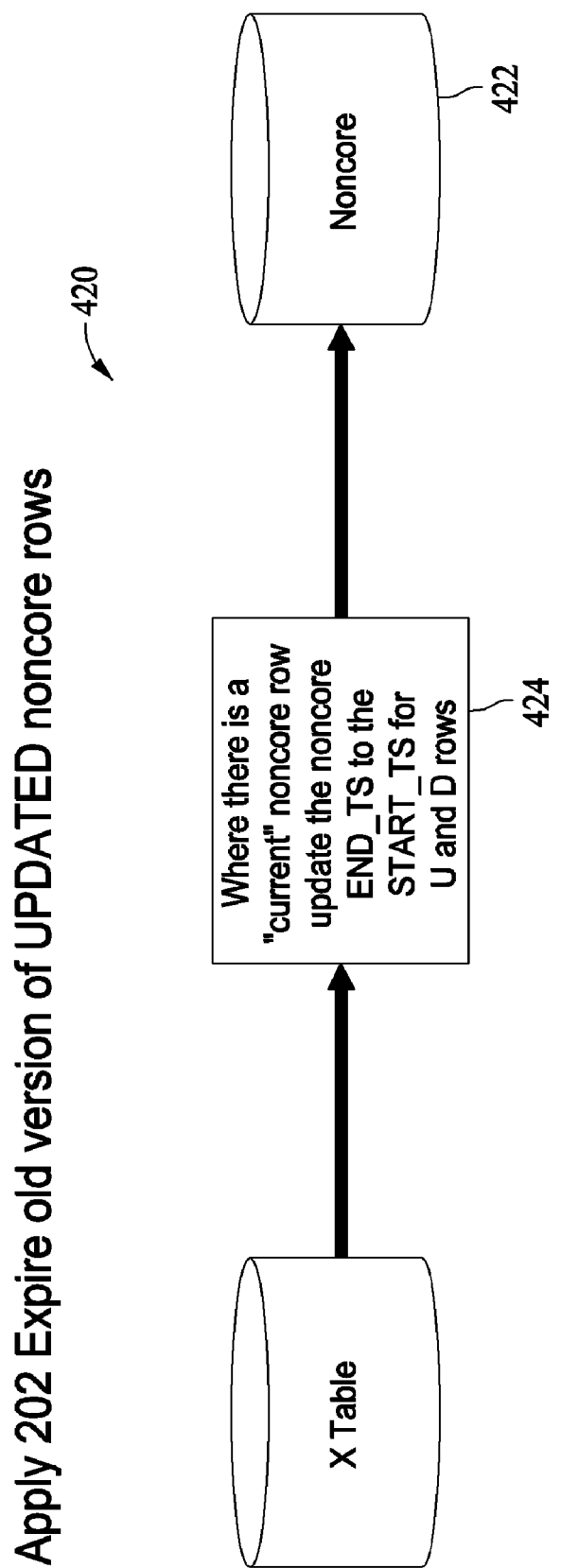
FIG. 12 is a data flow diagram illustrating expiration of a prior version of an updated noncore row.

FIG. 12 is a data flow diagram 420 illustrating apply step 202, which is the expiration of a prior version of an updated noncore 422 row. To update the noncore rows, the ending time stamp is updated 424 from null to the starting timestamp of the earliest successor row within the latest primary key from X_table 426 where the ETL Indicator is set to 'U'. This step covers setting the ending timestamp of the latest noncore row for updates, with the ending timestamp of one row being the starting timestamp of the next row.

The following is an example of pseudo code that is associated with apply step 202.

```
Step 202   Pseudo Code:
    UPDATE noncore
      SET SOURCE_END_TS = X_table.SRC_START_TS,
          CDW_END_TS = current TS used by ETL for table load
      WHERE noncore.PK_Latest = X_table.PK_Latest
        AND SOURCE_END_TS IS NULL
        AND X_table.SRC_START_TS >=
            noncore.SOURCE_START_TS
        AND X_table.ETL_INDICATOR = 'U'
        AND X_table.src_start_ts is the earliest within
            the PK_Latest for ETL_Indicator = 'U' rows;
```

Figure 13:
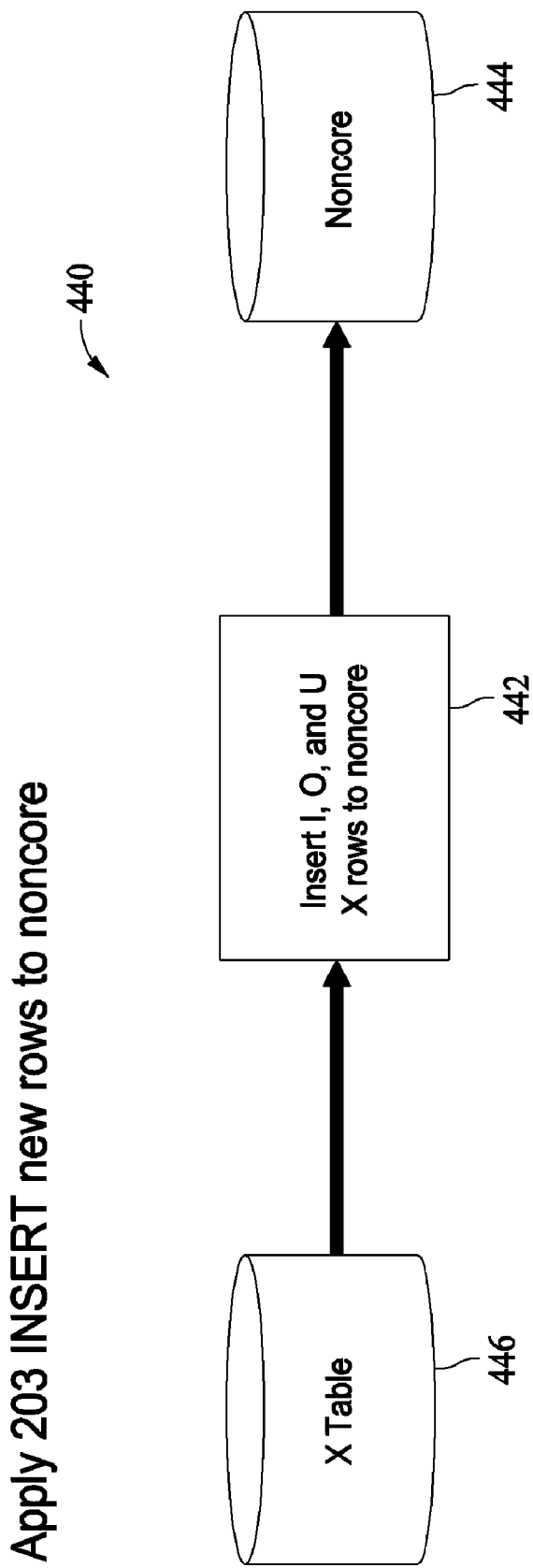
FIG. 13 is a data flow diagram illustrating insertion of new rows into noncore data.

FIG. 13 is a data flow diagram 440 illustrating apply step 203, which is the insertion 442 of new rows into noncore 444 for ETL indicators I, O and U. All incoming rows are loaded, except rows marked for deletion. Rows having an ETL_Indicator of I and some having an ETL_Indicator of U, become the latest, remaining U and all O rows are pre-expired. A case statement is used to set the ending timestamp to a fixed, current timestamp when the ending timestamp for the source is not null in the X_table 446 (ETL indicators O and U in most cases). All incoming rows are loaded, except deletes. I rows and one U row per primary key can become the latest (no ending timestamp) while additional U rows are pre-expired.

The following is an example of pseudo code that is associated with apply step 203.

```
Step 203   Pseudo Code:
    INSERT into noncore
      Select * from X_table
      Where ETL_Indicator = 'I', 'O' or 'U' ;
    -- add in current TS used by ETL for table load for CDW_START_TS
    and for END_TS of pre-expired rows
```

Figure 14:
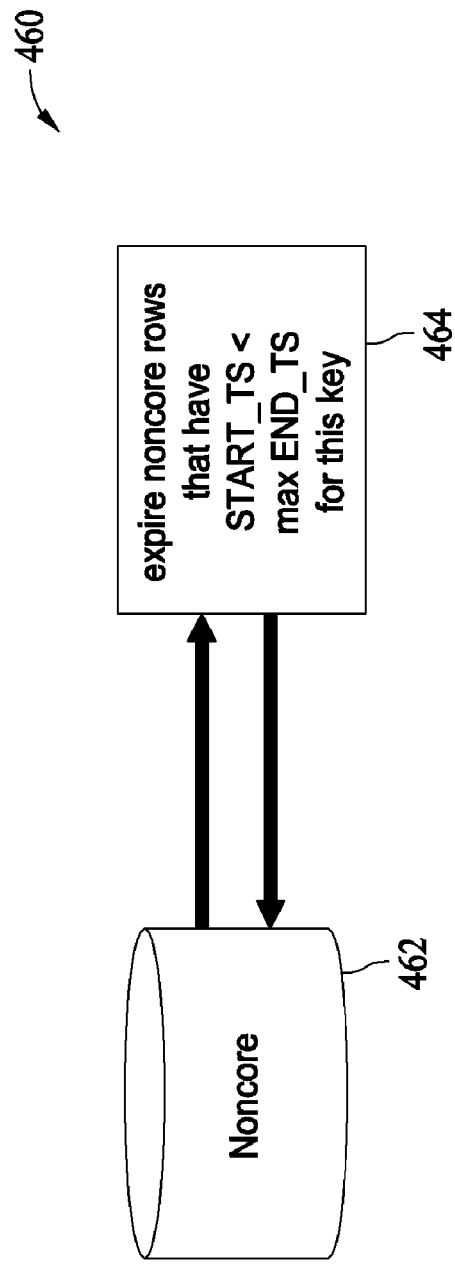
FIG. 14 is a data flow diagram illustrating an update of a newly inserted row in the noncore data.

FIG. 14 is a data flow diagram 460 illustrating apply step 204, which is the updating of a newly inserted 'O' row in the noncore data 462 when it should inherit a later expiry date from the prior row. This is the case where a row has already been deleted (expired 464) but an out-of-sequence update is received that happened before the delete took place but after the start time of the logically deleted row. The newly inserted row should get the later ending timestamp since it has the latest source starting timestamp.

The following is an example of pseudo code that is associated with apply step 204.

```
Step 204   Pseudo Code:
    UPDATE       NC_Tbl
    FROM   noncore     NC_Tbl ,
      ( SELECT PK_Latest
           , MAX ( SOURCE_END_TS )   MAX_END_TS
        FROM noncore
        GROUP BY  PK_Latest )   Max_NC
    SET  SOURCE_END_TS  = Max_NC.MAX_END_TS,
         CDW_END_TS = current TS used by ETL for table load
    WHERE    NC_Tbl.PK_Latest = Max_NC.PK_Latest
        AND    NC_Tbl.SOURCE_START_TS   <
        Max_NC.MAX_END_TS
        AND    NC_Tbl.SOURCE_END_TS       IS NULL ;
```

Figure 15:
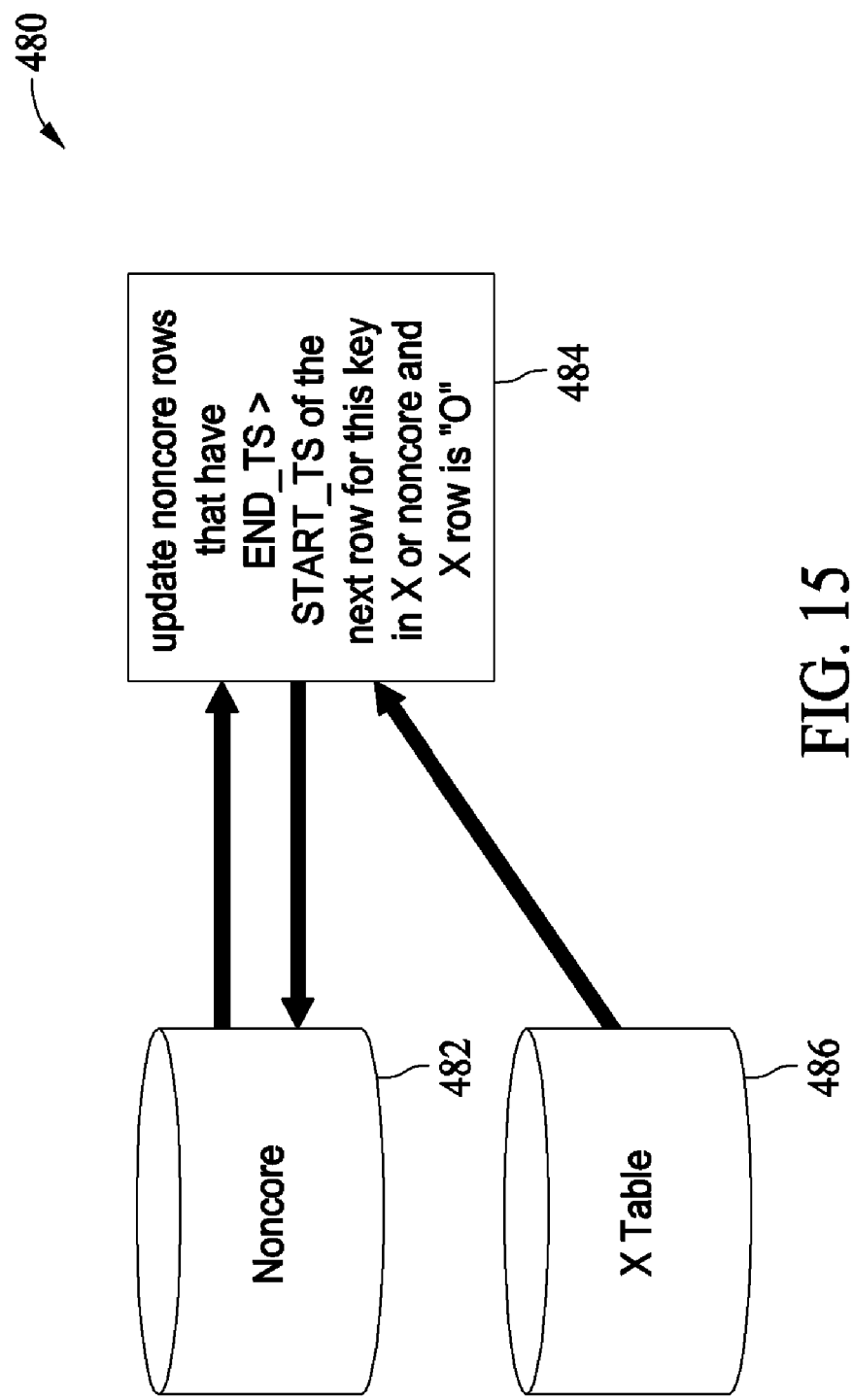
FIG. 15 is a data flow diagram illustrating the updating of the ending timestamp on noncore rows already expired.

FIG. 15 is a data flow diagram 480 illustrating apply step 205, which is the updating of the ending timestamp on noncore 482 rows already expired, but which have had a "missed" update 484 inserted immediately thereafter during apply step 203. In apply step 205, the "O" rows are used from the X_table 486, to correct the ending timestamp of rows which now have a different successor row due the 'O' row being inserted. The new ending timestamp is the starting timestamp of the newly inserted 'O' row.

The following is an example of pseudo code that is associated with apply step 205.

```
Step 205   Pseudo Code:
    UPDATE   NC_Tbl
    FROM   noncore      NC_Tbl ,
      ( SELECT NC_Tbl.PK_Latest
           , X_Tbl.SRC_START_TS          SRC_END_TS
           , MAX ( NC_Tbl.SOURCE_START_TS )
             SOURCE_START_TS
        FROM ( SELECT PK FROM  X_table
                 WHERE ETL_INDICATOR = 'O')   X_Tbl
           , ( SELECT PK FROM    noncore )   NC_Tbl
        WHERE    NC_Tbl.PK_Latest  = X_Tbl.PK_Latest
            AND  NC_Tbl.SOURCE_START_TS   <
                 X_Tbl.SRC_START_TS
         GROUP BY NC_Tbl.PK_Latest ,
         X_Tbl.SRC_START_TS) QQQ
    SET  SOURCE_END_TS  = QQQ.SRC_END_TS,
         CDW_END_TS = current TS used by ETL for table load
    WHERE    NC_Tbl.PK_Latest  = QQQ.PK_Latest
        AND   NC_Tbl.SOURCE_START_TS  =
              QQQ.SOURCE_START_TS ;
```

Figure 16:
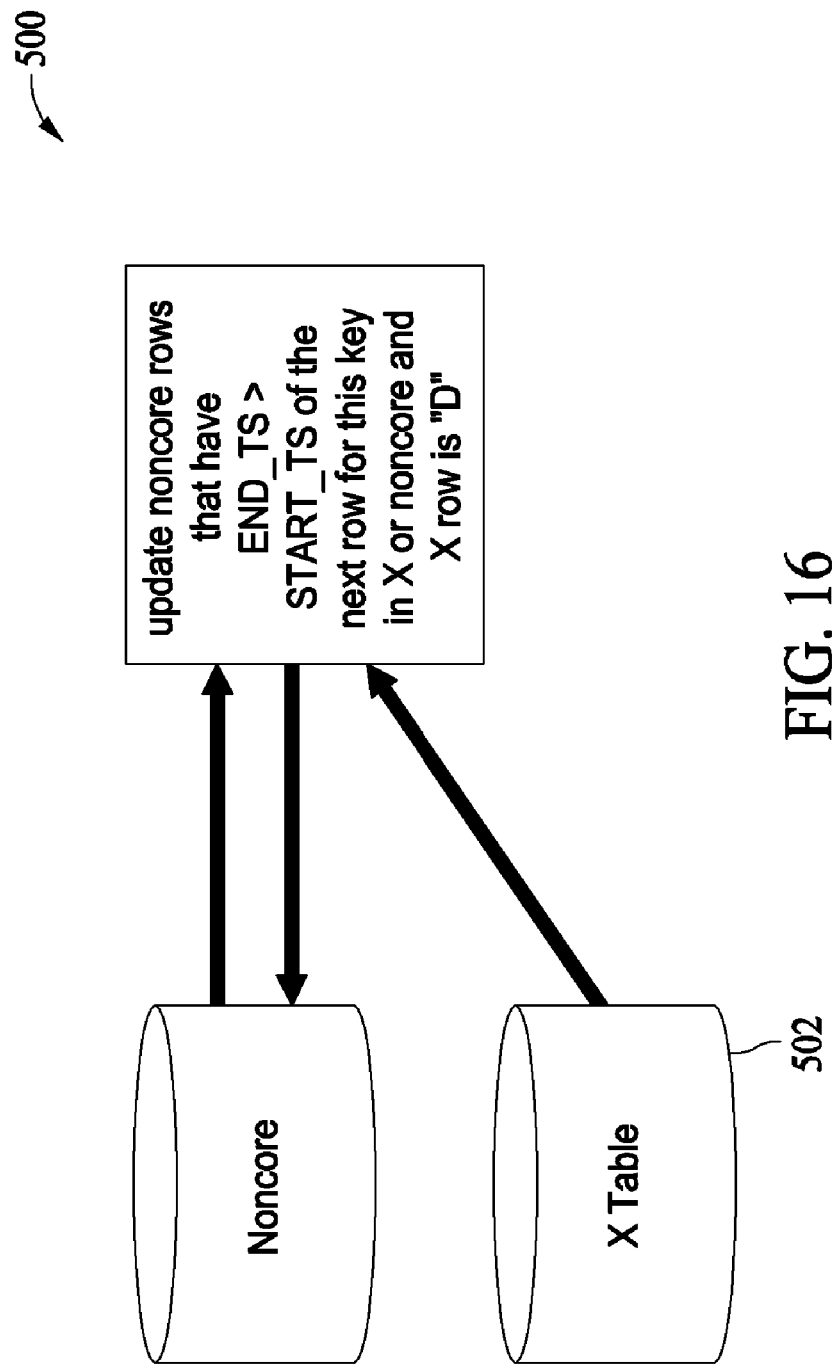
FIG. 16 is a data flow diagram illustrating expiration of noncore rows due to deletion.

FIG. 16 is a data flow diagram 500 illustrating apply step 206, which is the expiration of noncore rows due to logical deletion. For an ETL_Indicator of 'D', the source starting timestamp has been saved into the source ending timestamp in the X_table 502 to provide the full target primary key, and update 504 the ending timestamp to the delete timestamp value.

The following is an example of pseudo code that is associated with apply step 206.

```
Step 206   Pseudo Code:
    UPDATE         NC_Tbl
    FROM    noncore NC_Tbl, x table X_Tbl
    Set NC_Tbl source end ts = X_Tbl source start ts,
       NC_Tbl.cdw end ts = current TS used by ETL for table load
    Where  NC_Tbl.PK_latest = X_Tbl.PK_latest
       And NC_Tbl.source_start_ts = X_Tbl.src_end ts -- ensures 1-1
       And X_Table.ETL_Indicator is 'D'
       And NC_Tbl source end ts is null or greater than X table start ts
```

The following is an example of pseudo code that is associated with apply step 207.

```
Step 207   Pseudo Code:
COLLECT STATISTICS noncore;
END TRANSACTION
```

All change data capture (CDC) processes (the above described steps and apply steps) are completed before that portion of any subsequent mini-batch data load begins that writes to the W_ or X_tables or invokes CDC for a given source system or set of target tables. As such, the entire load process is not serialized, only the writing to the W_ or X_tables and the invocation of CDC.

The database names for stage and the target databases are parameterized appropriately for each CDW environment. Table names are parameterized based on the target table name and are assigned to the correct database name (W_tables and X_tables are in the stage database, the target table can be in the noncore, core or derived database). The identical parameterized CDC application is invoked for all implementations.

In addition, appropriate locking modifiers may be added to minimize lock contention, with all reads employing 'dirty read' equivalent to a 'LOCKING FOR ACCESS' or utilizing a view which already provides this (CDW_PK_COLS_V, database catalog views typically have this built in). ETL does not control access to the target data during the transaction that encapsulates the apply phase. The computer data warehousing architecture includes a 'dirty read' equivalent to 'LOCK FOR ACCESS' for outbound database views. The order of the apply steps described above within the transaction is set to minimize this issue. In alternative embodiments, additional SQL views are defined that wait for the transaction to be completed if needed.

The above described embodiments are utilized to load any volume of data from any source system without modification, with enough efficiency to support mini-batch schedules as often as 10 or 15 minutes into a continuously available temporal normalized data warehouse. These embodiments, with minor database-specific adjustments (e.g. name of catalog table listing columns), can be used on any relational database supporting the ANSI SQL-2003 standard (or a lower standard with some translation) to load a temporal normalized data warehouse that retains history and does not need to actively enforce referential integrity. The embodiments operate within a set of candidate rows and between those rows and the target database, allowing multiple rows within a primary key to be processed at once, sequenced and collapsed if a contiguous duplicate with respect to a time interval.

Therefore, in at least one embodiment, a method of populating a temporal normalized data warehouse is provided that includes analyzing a set of incoming data with respect to itself and an existing data warehouse, identifying and sequencing net change data using the relational algebra set of operators (set-SQL), and applying inserts and temporal updates to the data warehouse all while the data remains within the data warehouse itself. To accomplish the above described method, software code is dynamically generated to handle data inserts and temporal updates, and the generated code is then executed. Additionally, contiguous data is compressed into the minimum number of time periods, and nanosecond level sequences within unique timestamps are generated and maintained as needed.

In at least one embodiment, a system is provided that includes a data warehouse, a capability of receiving sets of incoming data to be stored into the data warehouse, and a sequencing unit operable to identify and sequence a net change in the data received against that previously stored in the data warehouse. The system may include one or more of a compression unit operable to compress contiguous data into the minimum time periods, an autocoder unit to generate code to perform data warehouse updates, and an execution unit to execute generated code. The sequencing unit is operable to utilize the relational algebra set of operators to identify and sequence data implemented in this instance using widely accepted ANSI-standard Structured Query Language (SQL) Data Manipulation Language (DML).

It is widely recognized that larger successful companies are moving to have a single or small number of normalized temporal data warehouses for most if not all analytic needs, replacing hundreds of operational data stores and data marts. This paradigm has created a substantial need for entirely new types of efficient and non-intrusive load software. The described embodiments provide a dramatic reduction in development and sustaining costs for a temporal data warehouse, large cost avoidance in data load server use and network traffic as work is much efficiently processed in SQL in the database, and avoids any need for a second copy of the target database during loading periods strictly to support continuous query availability (a second copy may still be utilized for other reasons). The described embodiments are applicable to any database platform as temporal data warehouse use grows globally and no current technology provides similar capabilities while also uniquely enabling a data warehouse strategy of supporting multiple types of analytic needs (operational, tactical, strategic) from a single copy of continuously available data across the scope of the data warehouse, whether one or more subject areas or the entire enterprise.

The described systems and methods support near real-time non-intrusive loading of a single normalized data warehouse, which in turn enables continuous and near immediate external access, via appropriate security and authorization controls, to a single copy of all data in a single system with history.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
   a data warehouse; and
   a computer executing a platform independent data warehouse load application, said load application comprising a sequencing unit configured to utilize timestamp data from incoming data to be stored in said data warehouse and a relational algebra of set operators to identify and sequence net changes between the incoming data and data previously stored within said data warehouse and normalize the identified and sequenced net changes with respect to a primary key within a table and a time period that varies with sequences of rows within the primary key, said load application configured to non-intrusively load the identified and sequenced net changes into said data warehouse,
   wherein to identify and sequence net changes between the incoming data and data previously stored within said data warehouse, said load application is configured to analyze a set of incoming data with respect to itself and existing data within said data warehouse.

2. The system of claim 1 wherein said load application further comprises a compression unit configured to compress contiguous data into a minimum number of time periods.

3. The system of claim 1 wherein said load application further comprises:
an autocoder unit configured to dynamically generate code operable to perform data warehouse insertions and updates; and
an execution unit to execute generated code.

4. The system of claim 3 wherein said autocoder unit is configured to dynamically generate ANSI-complaint SQL code based upon a table definition and a primary key using only ANSI-compliant SQL.

5. The system of claim 1 wherein said load application is configured to generate and maintain nanosecond level sequences within unique timestamps to ensure that all candidate rows with unique non-key attribution are loaded into said data warehouse.

6. The system of claim 1 wherein said load application is configured to utilize only set-structured query language to analyze interactions within and between incoming data and data existing within said data warehouse.

7. The system of claim 1 wherein said load application is configured to operate in a mini-batch mode, the mini batch mode invoked serially with respect to a target table as needed to support multiple data latencies and process with super-linear scalability a variable quantity of input data.

8. The system of claim 1 wherein said system comprises a massively parallel processing (MPP) architecture, said system is configured to leverage said MPP architecture and provide super-linear scalability utilizing said architecture.

9. The system of claim 1 wherein to identify and sequence net changes between the incoming data and data previously stored within said data warehouse, said sequencing unit is configured to query against a database catalog associated with the data warehouse, at run-time, for column name, data type information, and a primary key metadata table.

10. A method of loading a data warehouse, said method comprising:
analyzing a set of incoming data with respect to itself and an existing data warehouse;
identifying and sequencing any net change data between the incoming data and the existing data warehouse using a relational algebra set of operators;
normalizing said net changes with respect to a primary key within a table and a time period that varies with sequences of rows within the primary key; and
applying any net change data as an update to the data warehouse.

11. The method of claim 10 further comprising:
dynamically generating code to apply the net change data to the data warehouse; and
executing the generated code to insert the net change data into the data warehouse.

12. The method of claim 11 wherein dynamically generating code comprises dynamically generating ANSI-complaint SQL code based upon a table definition and a primary key using only ANSI-compliant SQL.

13. The method of claim 10 wherein applying any net change data as an update to the data warehouse comprises compressing contiguous net change data into a minimum number of time periods.

14. The method of claim 10 wherein applying any net change data as an update to the data warehouse comprises generating and maintaining nanosecond level sequences within unique timestamps to ensure that all candidate rows of net change data with unique non-key attribution are loaded into the data warehouse.

15. The method of claim 10 wherein identifying and sequencing any net change data comprises utilizing only set-structured query language to analyze interactions within and between the set of incoming data and data existing within the data warehouse.

16. The method of claim 10 wherein applying any net change data comprises non-intrusively loading the net change data into the data warehouse thereby allowing continual query access.

17. The method of claim 10 wherein identifying and sequencing any net change data between the incoming data and the existing data warehouse comprises querying against a database catalog associated with the data warehouse, at run-time, for column name, data type information, and a primary key metadata table.

18. A computer program embodied on a non-transitory computer readable medium for loading a data warehouse with net change data, said program comprising a code segment that:
utilizes an autocoder to dynamically generate code to analyze a set of incoming data with respect to itself and an existing data warehouse;
identifies and sequences net changes between the incoming data and data previously stored within the data warehouse by analyzing the incoming data with respect to itself and the previously stored data within said data warehouse;
normalizes the identified and sequenced net changes with respect to a primary key within a table and a time period that varies with sequences of rows within the primary key;
loads the normalized identified and sequenced net changes into the data warehouse.

19. A computer program according to claim 18 further comprising a code segment that dynamically generates ANSI-complaint SQL code based upon a table definition and a primary key using only ANSI-compliant SQL, the generated code applying the net change data to the data warehouse.

20. A computer program according to claim 18 further comprising a code segment that utilizes only set-structured query language to analyze interactions within and between the set of incoming data and data existing within the data warehouse.

* * * * *